(12) United States Patent
Kobayashi et al.

(10) Patent No.: US 12,445,658 B2
(45) Date of Patent: Oct. 14, 2025

(54) MOUNTING DEVICE AND IMAGE PROCESSING DEVICE

(71) Applicant: FUJI CORPORATION, Chiryu (JP)

(72) Inventors: Takahiro Kobayashi, Chiryu (JP); Yuta Yokoi, Kariya (JP); Kenshiro Nishida, Handa (JP)

(73) Assignee: FUJI CORPORATION, Chiryu (JP)

( * ) Notice: Subject to any disclaimer, the term of this patent is extended or adjusted under 35 U.S.C. 154(b) by 37 days.

(21) Appl. No.: 18/564,980

(22) PCT Filed: Jun. 4, 2021

(86) PCT No.: PCT/JP2021/021385
§ 371 (c)(1),
(2) Date: Nov. 28, 2023

(87) PCT Pub. No.: WO2022/254696
PCT Pub. Date: Dec. 8, 2022

(65) Prior Publication Data
US 2024/0298040 A1    Sep. 5, 2024

(51) Int. Cl.
*H04N 19/85* (2014.01)
*G06T 7/00* (2017.01)
(Continued)

(52) U.S. Cl.
CPC .......... *H04N 19/85* (2014.11); *G06T 7/0008* (2013.01); *H04N 9/64* (2013.01); *H04N 19/136* (2014.11);
(Continued)

(58) Field of Classification Search
CPC .... H04N 19/85; H04N 19/136; H04N 19/182; H04N 19/186; G06T 7/0008
See application file for complete search history.

(56) References Cited

U.S. PATENT DOCUMENTS

| 2019/0029150 A1 | 1/2019 | Onishi et al. |
| 2019/0335632 A1 | 10/2019 | Oike et al. |
| 2020/0100407 A1 | 3/2020 | Ito et al. |

FOREIGN PATENT DOCUMENTS

| JP | 2002-175528 A | 6/2002 |
| JP | 2020-96116 A | 6/2020 |

(Continued)

OTHER PUBLICATIONS

International Search Report mailed on Aug. 24, 2021 in PCT/JP2021/021385 filed on Jun. 4, 2021 (3 pages).

*Primary Examiner* — On S Mung
(74) *Attorney, Agent, or Firm* — Oblon, McClelland, Maier & Neustadt, L.L.P.

(57) ABSTRACT

A mounting device of the present disclosure is a device that mounts components on a board. The mounting device includes a mounting head including multiple holding bodies configured to hold the components at tips, an imaging section configured to capture a captured image including two or more of the multiple holding bodies, and an image processing section configured to execute post-compression image generation processing of generating a post-compression image by setting an area including a periphery of the tip of at least one holding body in the captured image as a target area, replacing pixels outside the target area in the captured image with pixels of the same color, and compressing a post-replacement image in a predetermined compression format.

5 Claims, 9 Drawing Sheets

(51) Int. Cl.
  *H04N 9/64*     (2023.01)
  *H04N 19/136*   (2014.01)
  *H04N 19/182*   (2014.01)
  *H04N 19/186*   (2014.01)

(52) U.S. Cl.
  CPC ......... *H04N 19/182* (2014.11); *H04N 19/186* (2014.11); *G06T 2207/30141* (2013.01)

(56) References Cited

FOREIGN PATENT DOCUMENTS

| WO | WO 2017/042929 A1 | 3/2017 |
| WO | WO 2017/216950 A1 | 12/2017 |
| WO | WO 2018/179365 A1 | 10/2018 |

MOUNTING DEVICE AND IMAGE PROCESSING DEVICE

TECHNICAL FIELD

The present description discloses a mounting device and an image processing device.

BACKGROUND ART

Conventionally, as a mounting device for mounting components on a board, a device including multiple nozzles and an imaging section that images the components held by the nozzles is known. For example, a side camera of a mounting device described in Patent Literature 1 images nozzles and components located at each of multiple nozzle positions from a side to acquire image data representing one image in which multiple obtained images are disposed in a left-right direction in the image. As a result, the side camera can simultaneously image the nozzles and the components located at the multiple nozzle positions from the side. The captured image is used to determine whether the components are correctly held by the nozzles during mounting processing, for example.

PATENT LITERATURE

Patent Literature 1: International Publication WO2018/179365

BRIEF SUMMARY

Technical Problem

Here, the image obtained by the imaging may be saved in a storage device so as to be usable later for analysis of an abnormality occurring in the mounting device, for example. However, in a case of obtaining the image data obtained by imaging objects at the multiple nozzle positions as in Patent Literature 1, since images of the multiple nozzle positions are always included in the image, a data amount of the image data may be enormous and suppress the capacity of the storage device.

The present disclosure has been made to solve the problem described above, and a main object thereof is to reduce a data amount of image data.

Solution to Problem

The present disclosure adopts the following configurations to achieve the main object described above.

A first mounting device of the present disclosure is a mounting device for mounting components on a board, the mounting device including a mounting head including multiple holding bodies configured to hold the components at tips, an imaging section configured to capture a captured image including two or more of the multiple holding bodies, and an image processing section configured to execute post-compression image generation processing of generating a post-compression image by setting an area including a periphery of the tip of at least one holding body in the captured image as a target area, replacing pixels outside the target area in the captured image with pixels of the same color, and compressing a post-replacement image in a predetermined compression format.

In the first mounting device, the imaging section captures the captured image including two or more of the multiple holding bodies. Then, the image processing section is configured to execute the post-compression image generation processing of generating the post-compression image by setting the area including the periphery of the tip of at least one holding body in the captured image as the target area, replacing pixels outside the target area in the captured image with pixels of the same color, and compressing the post-replacement image in the predetermined compression format. Since the post-compression image generated in this way is obtained by compressing the image in which a portion other than the target area is replaced with pixels of the same color, a compression ratio is improved as compared with a case where the image is compressed without executing the replacement. As a result, a data amount of the image data (post-compression image) can be reduced.

DESCRIPTION OF EMBODIMENTS

Figure 1:
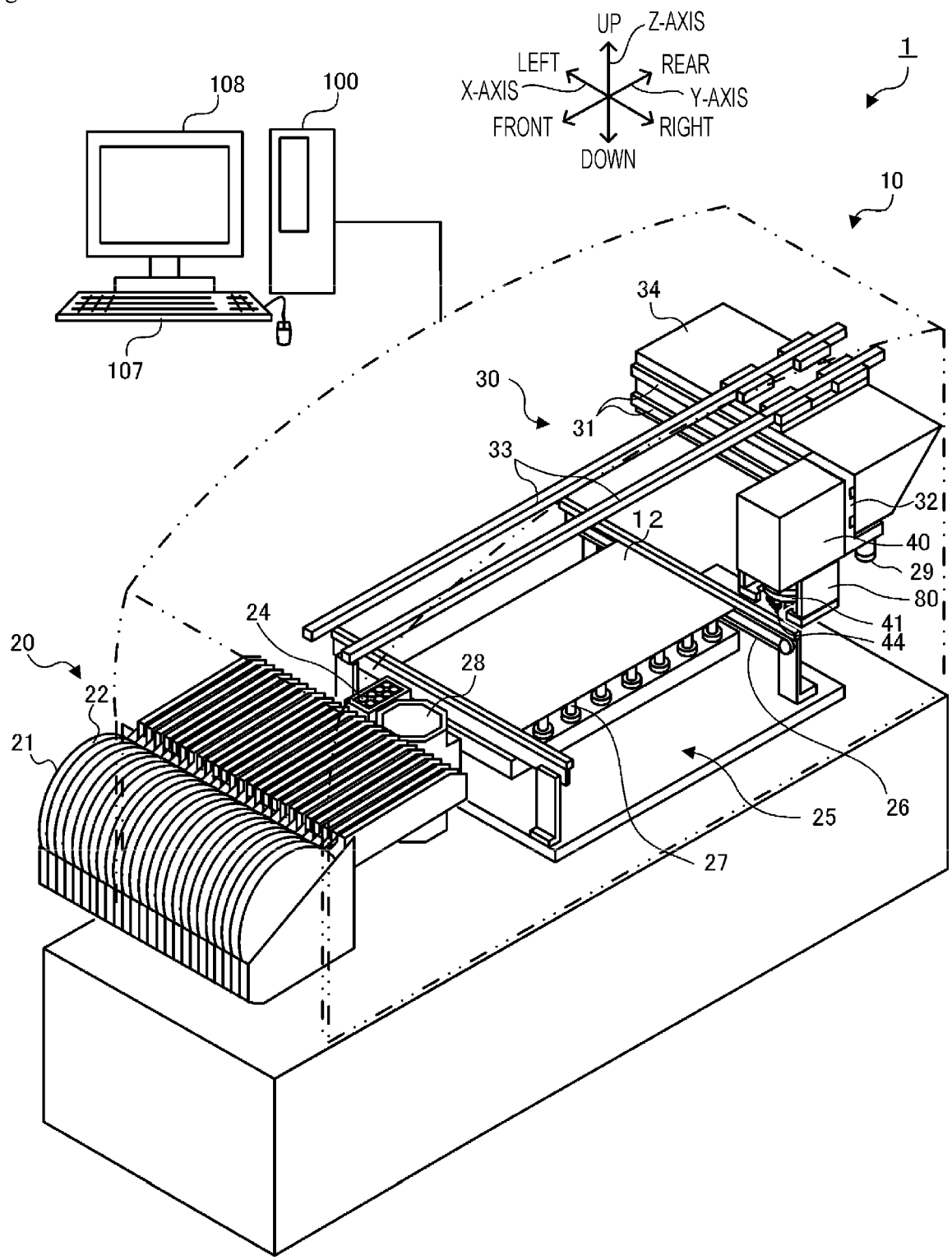
FIG. 1 is a configuration diagram illustrating a schematic configuration of mounting system 1 including mounting device 10.
Figure 2:
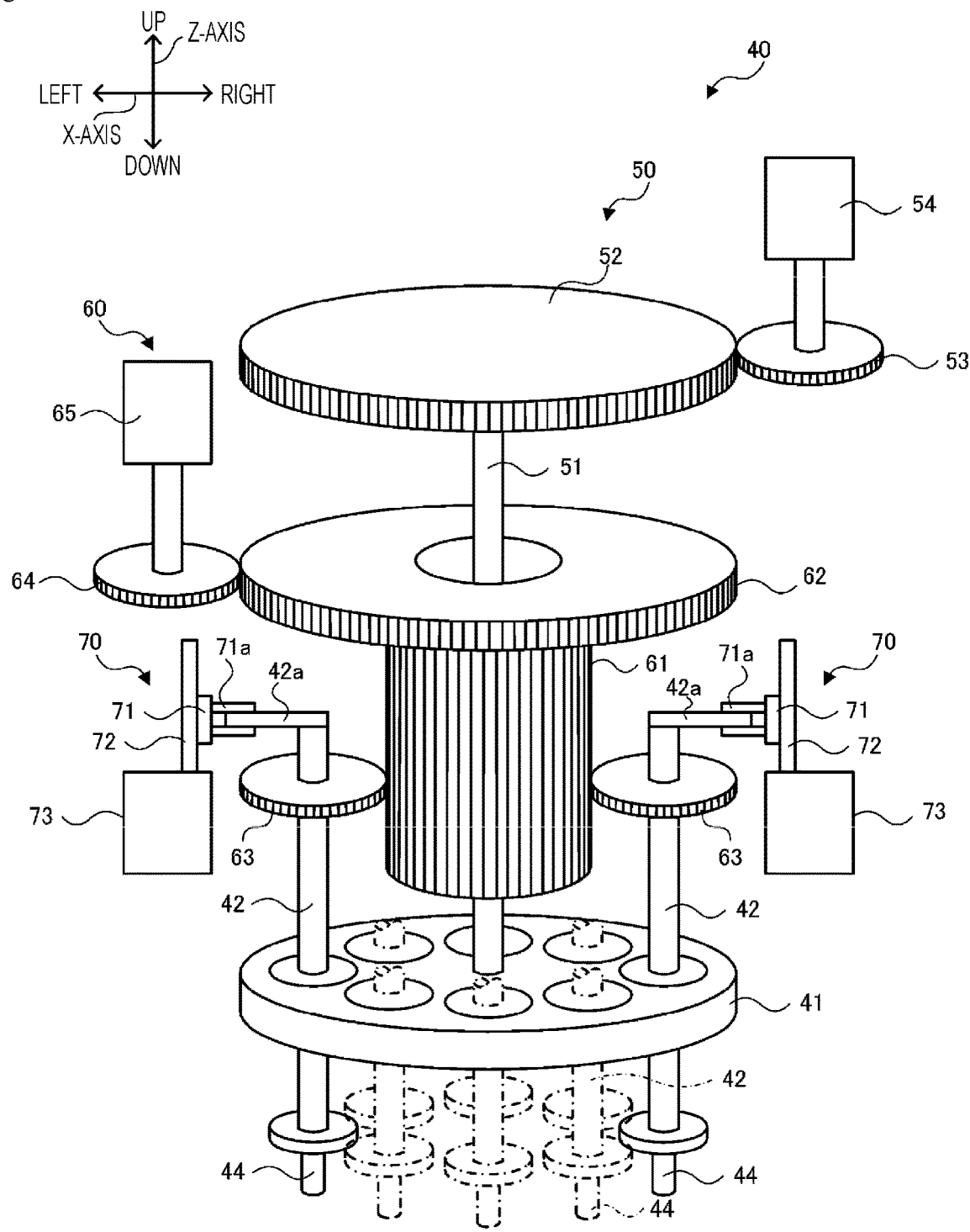
FIG. 2 is a view illustrating a schematic configuration of mounting head 40.
Figure 3:
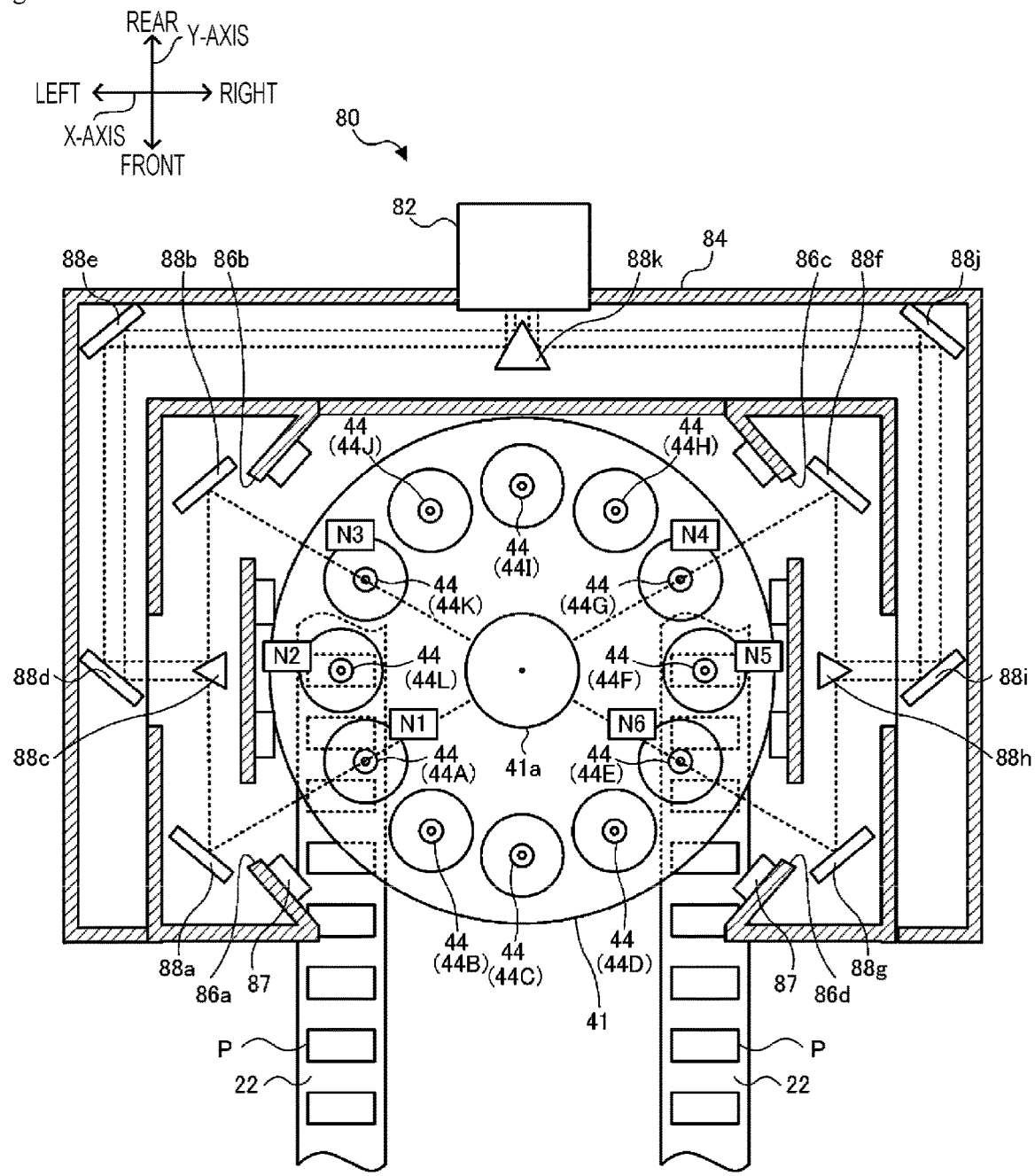
FIG. 3 is a plan view illustrating the disposition of nozzles 44 and a schematic configuration of side camera 80.
Figure 4:
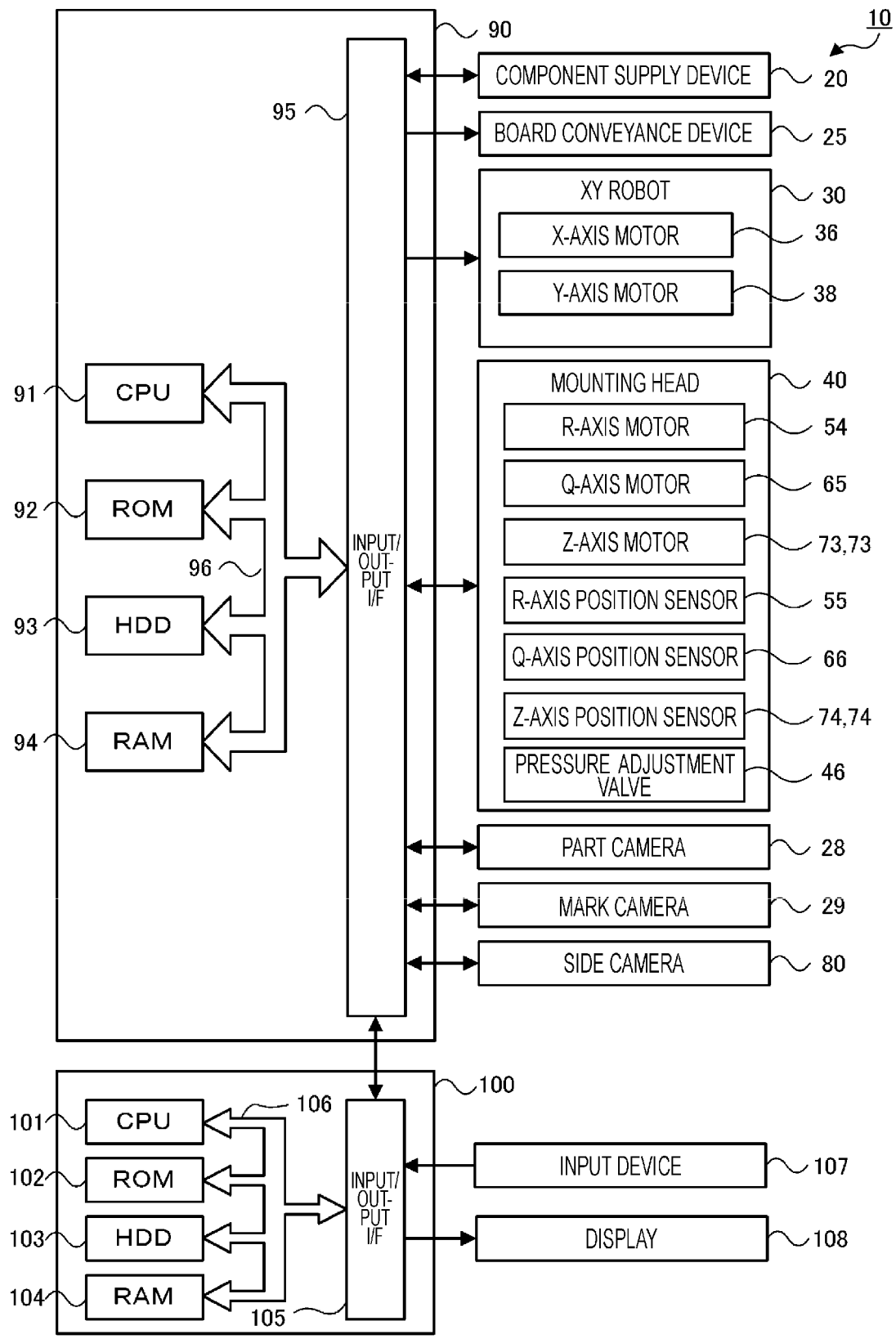
FIG. 4 is a view illustrating an electric connection relationship of control device 90.

Embodiments of a mounting device and an image processing device of the present disclosure will be described below with reference to the drawings. FIG. 1 is a configuration diagram illustrating a schematic configuration of mounting system 1 including mounting device 10 of the present embodiment, FIG. 2 is a view illustrating a schematic configuration of mounting head 40, FIG. 3 is a plan view illustrating the disposition of nozzles 44 and a schematic configuration of side camera 80, and FIG. 4 is a view illustrating an electric connection relationship of control device 90. In FIG. 1, a left-right direction is an X-axis direction, a front (near side)-rear (far side) direction is a Y-axis direction, and an up-down direction is a Z-axis direction.

As illustrated in FIG. 1, mounting system 1 includes mounting device 10 and management device 100 that manages mounting device 10. Mounting system 1 includes a mounting line in which multiple mounting devices 10 that mount components P on board 12 are disposed along a conveyance direction (X-axis direction) of board 12. In FIG. 1, only one mounting device 10 in the mounting line is illustrated for the sake of convenience of description.

Mounting system 1 may include a solder printing machine, an inspection machine, a reflow furnace, or the like on the same mounting line as mounting device 10.

As illustrated in FIG. 1, mounting device 10 includes component supply device 20, board conveyance device 25, XY robot 30, mounting head 40, nozzle stocker 24, part camera 28, mark camera 29, side camera 80, and control device 90 (see FIG. 4).

Multiple component supply device 20 are arranged in the left-right direction (X-axis direction) on a front side of mounting device 10. Component supply device 20 is configured as a tape feeder that pulls out tape 22 (see FIG. 3) on which components P are accommodated at predetermined intervals from reel 21 to feed tape 22 at a predetermined pitch. Components P accommodated on tape 22 are protected by a film covering a surface of tape 22. Component P that reaches a predetermined component supply position is in a state where the film is peeled off and exposed.

As illustrated in FIG. 1, board conveyance device 25 includes pair of conveyor belts 26 and 26 (only one is illustrated in FIG. 1) provided at an interval from each other in the front-rear direction and bridged in the left-right direction. When board 12 is conveyed by conveyor belts 26 and 26 to reach a predetermined capture position, board 12 is supported by multiple support pins 27 erected on a rear surface side.

As illustrated in FIG. 1, XY robot 30 includes pair of left and right Y-axis guide rails 33 and 33 provided along the front-rear direction (Y-axis direction) and Y-axis slider 34 being bridged over pair of left and right Y-axis guide rails 33 and 33. XY robot 30 includes X-axis guide rails 31 and 31 provided on a front surface of Y-axis slider 34 along the left-right direction (X-axis direction) and X-axis slider 32 attached to X-axis guide rails 31 and 31. X-axis slider 32 is movable in the X-axis direction by being driven by X-axis motor 36 (see FIG. 4), and Y-axis slider 34 is movable in the Y-axis direction by being driven by Y-axis motor 38 (see FIG. 4). Mounting head 40, mark camera 29, and side camera 80 are attached to X-axis slider 32. When XY robot 30 is moved, mounting head 40, mark camera 29, and side camera 80 are moved to any position on an XY plane.

As illustrated in FIG. 2, mounting head 40 includes head main body 41, nozzle holders 42, and nozzles 44. Head main body 41 is a disk-like rotating body. Cylindrical reflective body 41*a* that can reflect light is attached to a center of a lower surface of head main body 41 (see FIG. 3). Multiple nozzle holders 42 are provided at predetermined intervals in a circumferential direction of head main body 41, and thus mounting head 40 is configured as a rotary head. Nozzles 44 are attached to tip portions of nozzle holders 42 in an exchangeable manner. Nozzles 44 are attached to head main body 41 via nozzle holders 42, and are disposed along the circumferential direction of head main body 41. In FIG. 2, for the sake of easy viewing of nozzle holders 42, reflective body 41*a* is omitted from illustration, and eight nozzle holders 42 and eight nozzles 44 are illustrated, but in the present embodiment, the number of nozzles 44 is 12 as illustrated in FIG. 3. Therefore, the number of nozzle holders 42 is also 12. As illustrated in FIG. 3, 12 nozzles 44 are sequentially referred to as nozzles 44A to 44L counterclockwise from nozzle 44 located at an 8 o'clock position in FIG. 3. Mounting head 40 includes R-axis drive device 50, Q-axis drive device 60, and Z-axis drive devices 70 and 70. In FIG. 2, for the sake of convenience of description, two nozzle holders 42 located at positions at which nozzle holders 42 are engaged with Z-axis drive devices 70 and 70 are illustrated by solid lines, and other nozzle holders 42 are illustrated by one-point chain lines.

R-axis drive device 50 is a mechanism that revolves multiple nozzles 44 by rotating head main body 41. R-axis drive device 50 includes R shaft 51, R-axis motor 54, and R-axis position sensor 55 (see FIG. 4). R shaft 51 extends in the up-down direction, and has a lower end attached to a center shaft of head main body 41. R-axis motor 54 rotationally drives gear 53 meshing with R-axis gear 52 provided at an upper end of R shaft 51. R-axis position sensor 55 detects a rotation position of R-axis motor 54. R-axis drive device 50 rotationally drives R shaft 51 by R-axis motor 54 via gear 53 and R-axis gear 52 to rotate head main body 41. When head main body 41 is rotated, multiple nozzle holders 42 and multiple nozzles 44 are revolved in the circumferential direction together with head main body 41. That is, when R-axis drive device 50 is driven, multiple nozzles 44 are revolved along a revolution trajectory centered at a rotation axis of head main body 41. R-axis drive device 50 can intermittently revolve nozzles 44 by a predetermined angle by intermittently rotating head main body 41 by a predetermined angle (for example, 30 degrees).

Here, on the revolution trajectory of nozzles 44, there are one or more operation positions at which nozzles 44 pick up components P from component supply device 20 and mount components P picked up by nozzles 44 on board 12. In the present embodiment, two nozzle positions N2 and N5 illustrated in FIG. 3 are the operation positions. At the operation position, operations, such as exchange of nozzles 44 and disposal of components P picked up by nozzles 44, can also be executed. Nozzle positions N2 and N5 are located at positions laterally facing each other across a center axis of the revolution trajectory of nozzles 44. Nozzle position N2 is a position at a left end on the revolution trajectory of nozzles 44 (9 o'clock position in FIG. 3), and nozzle position N5 is a position at a right end of the revolution trajectory of nozzles 44 (3 o'clock position in FIG. 3). In FIG. 3, nozzle 44L is located at nozzle position N2, and nozzle 44F is located at nozzle position N5. When nozzle 44 is located at nozzle position N2 on the revolution trajectory of nozzles 44, a position of nozzle 44 (nozzle 44A in FIG. 3) in immediately front of nozzle 44 located at nozzle position N2 is referred to as nozzle position N1, and a position of nozzle 44 (nozzle 44K in FIG. 3) immediately behind nozzle 44 located at nozzle position N2 is referred to as nozzle position N3. Similarly, a position of nozzle 44 (nozzle 44G in FIG. 3) in immediately front of nozzle 44 (nozzle 44F in FIG. 3) located at nozzle position N5 is referred to as nozzle position N4, and a position of nozzle 44 (nozzle 44E in FIG. 3) immediately behind nozzle 44 located at nozzle position N5 is referred to as nozzle position N6. Since nozzle positions N1 and N4 are positions in immediately front of (immediate before) the operation positions (nozzle positions N2 and N5) on the revolution trajectory of nozzle 44, nozzle positions N1 and N4 are also referred to as immediately preceding positions. Since nozzle positions N3 and N6 are positions immediately behind (immediately after) the operation positions (nozzle positions N2 and N5) on the revolution trajectory of nozzle 44, nozzle positions N3 and N6 are also referred to as immediately following positions. Nozzle positions N1, N3, N4, and N6 are positions at which side camera 80 images at least one of nozzle 44 and component P held by nozzle 44 and are also referred to as imaging positions. In the present embodiment, as described above, the imaging position is a position different from the operation position, and the immediately preceding position and the immediately following position are the imaging positions.

Q-axis drive device 60 is a mechanism that rotates (rotates on their axes) multiple nozzles 44 in synchronism with each other. Q-axis drive device 60 includes two upper and lower Q-axis gears 61 and 62, gears 63 and 64, Q-axis motor 65, and Q-axis position sensor 66 (see FIG. 4). Two upper and lower Q-axis gears 61 and 62 are inserted coaxially and relatively rotatably with respect to R shaft 51. Gear 63 is provided at an upper portion of each nozzle holder 42 and meshes with lower Q-axis gear 61 to be slidable in the up-down direction. Q-axis motor 65 rotationally drives gear 64 meshing with upper Q-axis gear 62. Q-axis position sensor 66 detects a rotation position of Q-axis motor 65. Q-axis drive device 60 rotationally drives Q-axis gears 61 and 62 by Q-axis motor 65, to rotate gear 63 meshing with Q-axis gear 61 and to rotate each nozzle holder 42 by the same rotation amount (rotation angle) in the same rotation direction about its central axis. As a result, multiple nozzles 44 are also rotated on their axes in synchronism with each other.

Z-axis drive devices 70 and 70 are provided at two locations on the revolution trajectory of nozzle holders 42 and can lift and lower nozzle holders 42 individually at the two locations. In the present embodiment, Z-axis drive devices 70 and 70 laterally face each other across the center of head main body 41. A position of nozzle holder 42 that can be lifted and lowered by Z-axis drive device 70 is referred to as a lifting and lowering position. The lifting and lowering position is the same position as the operation positions of nozzles 44 in a top view, that is, nozzle positions N2 and N5. Z-axis drive device 70 includes Z-axis slider 71, Z-axis motor 73, and Z-axis position sensor 74 (see FIG. 4). Z-axis slider 71 is attached to ball screw 72 extending in the up-down direction in a liftable and lowerable manner. Z-axis slider 71 includes gripping section 71a that grips engagement piece 42a extending laterally from nozzle holder 42. Z-axis motor 73 lifts and lowers Z-axis slider 71 by rotating ball screw 72. Z-axis position sensor 74 detects a position of Z-axis slider 71 in the up-down direction. Z-axis drive device 70 drives Z-axis motor 73 to lift and lower Z-axis slider 71 along ball screw 72 to lift and lower nozzle holder 42 integrated with Z-axis slider 71 and nozzle 44. When nozzle holder 42 is revolved together with head main body 41 and is stopped at the lifting and lowering position at which Z-axis drive device 70 is disposed, engagement pieces 42a of nozzle holders 42 are gripped by gripping section 71a of Z-axis slider 71. Therefore, Z-axis drive device 70 lifts and lowers nozzle holders 42 and nozzles 44 located at the lifting and lowering position. When nozzle holders 42 are revolved and is moved from the lifting and lowering position, engagement pieces 42a of nozzle holders 42 come out of gripping section 71a of Z-axis slider 71.

Nozzles 44 are members that pick up components P from component supply device 20 and hold components P. Nozzles 44 pick up components P by suction and hold components P at the tips (lower ends) of nozzles 44 when a negative pressure is supplied to nozzles 44 via pressure adjustment valve 46 (see FIG. 4), and release components P when an atmospheric pressure or a positive pressure is supplied.

As illustrated in FIG. 1, nozzle stocker 24 is provided between component supply device 20 and board conveyance device 25. Multiple types of nozzles 44 can be stocked in nozzle stocker 24. By exchanging nozzles 44 between nozzle stocker 24 and mounting head 40, nozzle 44 suitable for a size of component P to be mounted can be attached to mounting head 40.

As illustrated in FIG. 1, part camera 28 is provided between component supply device 20 and board conveyance device 25. Part camera 28 images, from below, a posture of component P picked up by suction and held by nozzle 44.

Mark camera 29 is provided on a lower surface of X-axis slider 32. Mark camera 29 images a fiducial mark of component supply device 20 or images a fiducial mark provided on board 12. Control device 90 specifies the positions of components P accommodated on tape 22 or specifies the position of board 12 based on the positions of the fiducial mark in the captured image.

Side camera 80 is a device that captures a captured image including two or more of multiple nozzles 44. In the present embodiment, side camera 80 images an object located at each of the four imaging positions (nozzle positions N1, N3, N4, and N6) from the side. Side camera 80 images at least one of nozzle 44 located at the imaging position and component P held by nozzle 44. Side camera 80 images component P held to nozzle 44 located at the imaging position. As illustrated in FIG. 3, side camera 80 includes camera main body 82 provided behind nozzle 44, and housing 84 having an optical system unit that forms an optical path to camera main body 82. Housing 84 surrounds the right, left, and rear of multiple nozzles 44. First to fourth incidence ports 86a to 86d are formed in housing 84 at left front, left rear, right rear and right front positions of head main body 41. First to fourth incidence ports 86a to 86d face nozzle positions N1, N3, N4, and N6, respectively, in a one-to-one basis. Additionally, multiple (four on each of the left and right of head main body 41 in FIG. 3) luminous bodies 87, which are LEDs emitting light toward reflective body 41a attached to head main body 41, are provided on an outer circumferential surface of housing 84 that faces multiple nozzles 44. Housing 84 includes multiple mirrors 88a to 88k that reflect light in an interior thereof. Housing 84 may include another optical system, such as a prism that refracts light, instead of one or more of mirrors 88a to 88k or in addition to mirrors 88a to 88k. Mirrors 88a to 88e are disposed on the left side in housing 84 to form the optical path indicated by a broken line in the figure and guide light incident from first and second incidence ports 86a and 86b to mirror 88k disposed in front of camera main body 82. For example, light incident from first incidence port 86a is reflected sequentially by mirrors 88a, 88c, 88d, and 88e in this order and reaches mirror 88k. Mirrors 88f to 88j are disposed on the right side in housing 84 to form the optical path indicated by a broken line in the figure and guide light incident from third and fourth incidence ports 86c and 86d to mirror 88k. Mirror 88k reflects the light reaching from first to fourth incidence ports 86a to 86d and guides the light to camera main body 82.

Side camera 80 includes the optical system unit having first to fourth incidence ports 86a to 86d, luminous body 87, and mirrors 88a to 88k, as described above. As a result, the light from each of nozzle positions N1, N3, N4, and N6 reaches different areas of an imaging element of camera main body 82 and forms the image. Therefore, camera main body 82 can image the objects located at nozzle positions N1, N3, N4, and N6, respectively, in one imaging operation, and can acquire the captured image in which the obtained images are disposed in one image. Therefore, camera main body 82 can simultaneously image nozzles 44 and components P located in nozzle positions N1, N3, N4, and N6 from the side. In the present embodiment, camera main body 82 acquires image data representing one captured image in which the objects located at nozzle positions N3, N1, N6, and N4 are disposed in this order from the left to the right as illustrated in the upper part of FIG. 8 and the upper part of FIG. 9 described later. The disposition and the shapes of first to fourth incidence ports 86a to 86d and mirrors 88a to 88k are adjusted such that the directions in which camera main body 82 images each of the imaging positions is directions along the radial direction of the revolution trajectory of nozzles 44, that is, directions toward the center of the revolution trajectory of nozzles 44. Camera main body 82 receives the light emitted from luminous bodies 87 and reflected by reflective body 41a. Therefore, in the captured image, nozzles 44 and components P that block light are shown as black shadows.

As illustrated in FIG. 4, control device 90 is configured as a microprocessor centering on CPU 91 and includes ROM 92, HDD 93, RAM 94, input/output interface 95, or the like in addition to CPU 91. These sections are connected with one another via bus 96. A detection signal from XY robot 30, a detection signal from mounting head 40 (R-axis position sensor 55, Q-axis position sensor 66, or Z-axis position sensors 74 and 74), an image signal from part camera 28, an image signal from mark camera 29, an image signal from side camera 80, and the like are input to control device 90 via input/output interface 95. Control device 90 outputs control signals and the like to component supply device 20, board conveyance device 25, XY robot 30 (X-axis motor 36 and Y-axis motor 38), mounting head 40 (R-axis motor 54, Q-axis motor 65, and Z-axis motors 73 and 73), pressure adjustment valve 46, part camera 28, mark camera 29, and side camera 80 via input/output interface 95. In addition, control device 90 is connected to management device 100 so as to be capable of bidirectional communication, and exchanges the data or the control signals with each other.

Figure 5:
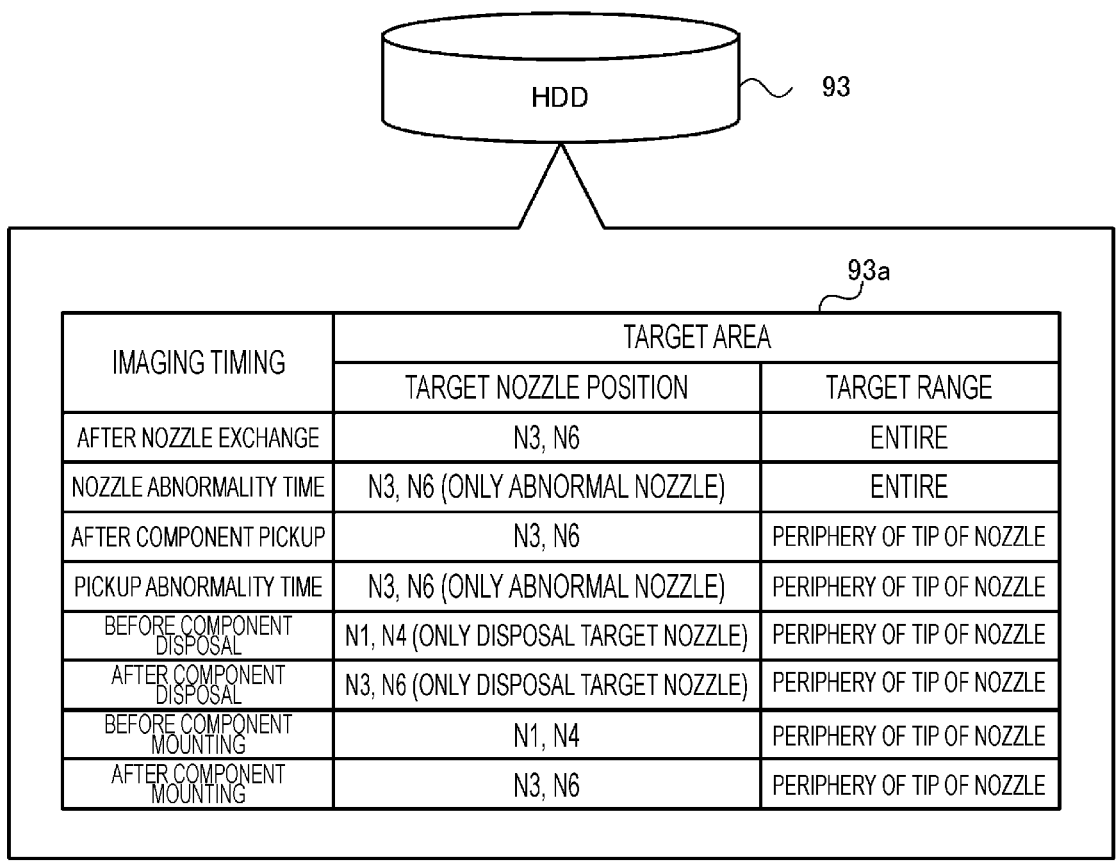
FIG. 5 is a view illustrating an example of correspondence relationship information 93a stored in HDD 93.

HDD 93 is an example of a nonvolatile memory that holds information even when the power is turned off, and stores correspondence relationship information 93a as illustrated in FIG. 5. Correspondence relationship information 93a is information indicating a correspondence relationship between an imaging timing and a target area in relation to the captured image acquired by side camera 80. For example, in correspondence relationship information 93a illustrated in FIG. 5, after nozzle exchange, a nozzle abnormality time, after component pickup, a pickup abnormality time, before component disposal, after component disposal, before component mounting, and after component mounting are included as the imaging timings, and information related to the target area is associated with each of these timings. The target area is an area that is a target left as an image when the captured image is processed by executing post-compression image generation processing described later. The target area is determined as an area including the periphery of the tip of at least one nozzle 44 in the captured image. In addition, the target area is set to include an area (area of the captured image that is a target of abnormality determination) of the captured image which is used for various types of abnormality determination in a mounting processing routine described later. For example, correspondence relationship information 93a illustrated in FIG. 5 includes information related to a target nozzle position and information related to a target range, as the target area. The information related to the target nozzle position is information related to which of the imaging positions (here, nozzle positions N1, N3, N4, and N6) is set as the target area. In the present embodiment, one or more of multiple imaging positions are set to be included for each imaging timing. The information related to the target range is information related to a range of the target nozzle position as the target area. In the present embodiment, any one of "entire" and "periphery of tip of nozzle" is set for each imaging timing. For example, in correspondence relationship information 93a illustrated in FIG. 5, "entire images of nozzle positions N3 and N6 in the captured image" as the target area is associated with the imaging timing of "after nozzle exchange". In addition, "periphery of tip of nozzle 44 in each image of nozzle positions N1 and N4 in the captured image" as the target area is associated with the imaging timing of "before component mounting".

Management device 100 is a device that manages entire mounting system 1. As illustrated in FIG. 4, management device 100 includes CPU 101, ROM 102, HDD 103, RAM 104, and input/output interface 105. These sections are electrically connected with one another via bus 106. Management device 100 includes input device 107, such as a keyboard or a mouse, and display 108, such as LCD. An input signal from input device 107 is input to management device 100 via input/output interface 105. The image signal to display 108 is output from management device 100 via input/output interface 105. Management device 100 transmits and receives information to and from control device 90 of mounting device 10 via input/output interface 105. HDD 103 of management device 100 is an example of a nonvolatile memory that holds information even when the power is turned off, and stores a production program of board 12, various data transmitted from multiple mounting devices 10 in mounting system 1, or the like. The production program of board 12 includes, for each of multiple mounting devices 10 of mounting system 1, information indicating which component P is to be mounted at which position on which board 12 by mounting device 10 in which order and information indicating how many boards 12 on which the mounting is executed in this way are to be produced. The production program also includes information related to a height (thickness) of component P.

Figure 6:
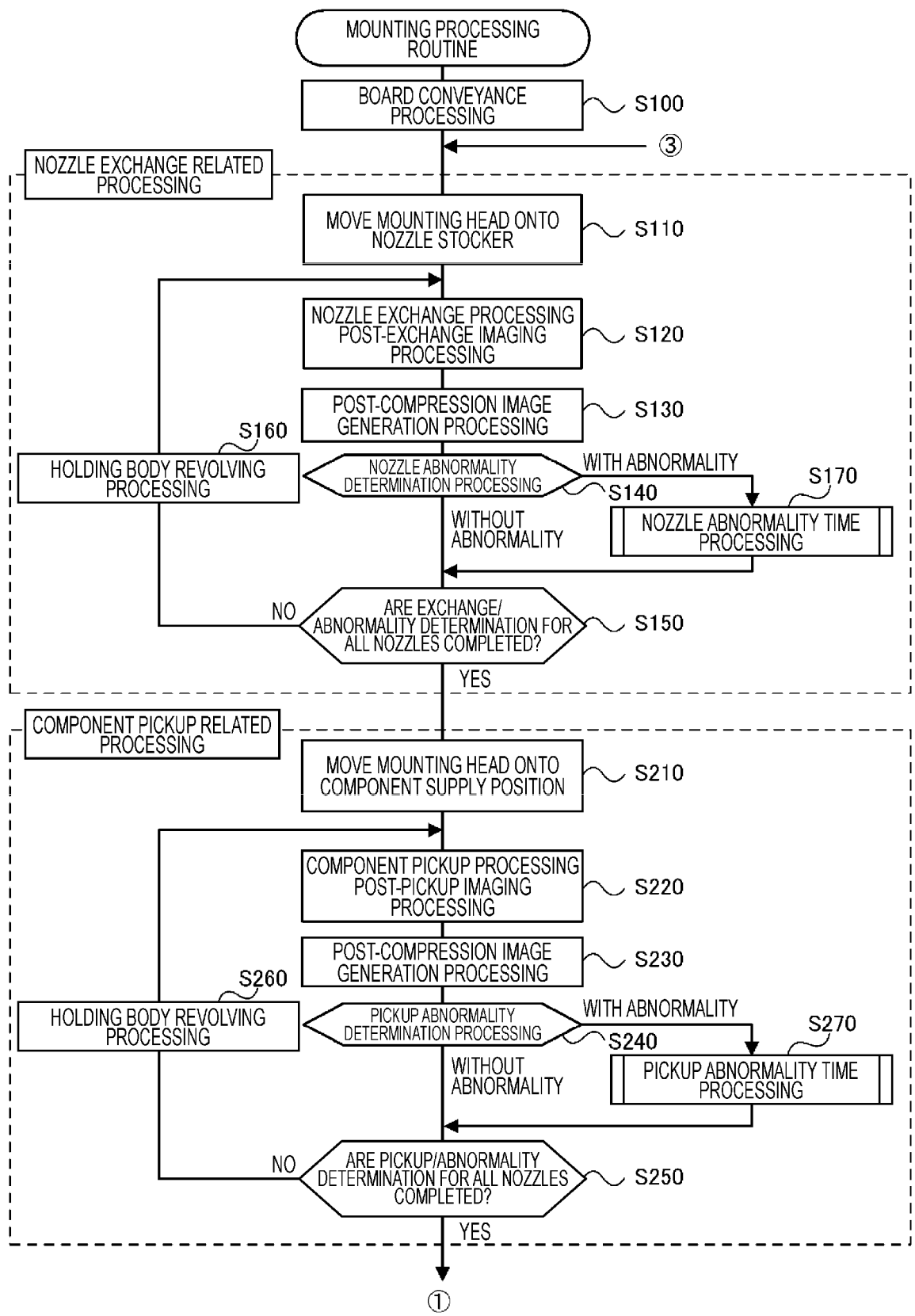
FIG. 6 is a flowchart illustrating an example of a mounting processing routine.
Figure 7:
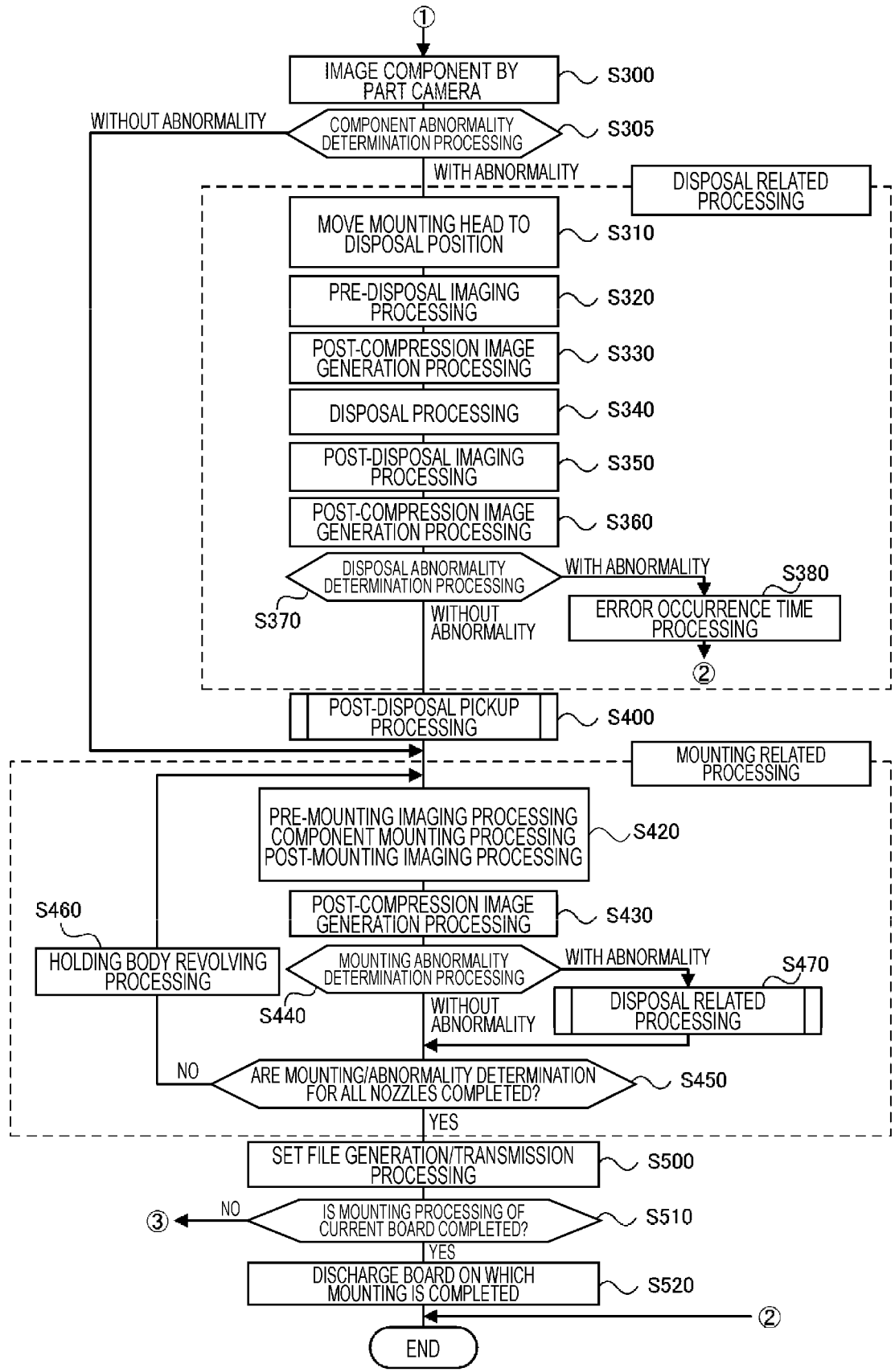
FIG. 7 is a flowchart illustrating an example of the mounting processing routine.

Next, an operation of mounting system 1 configured as described above, particularly, an operation of mounting device 10 will be described in detail. FIGS. 6 and 7 are flowcharts illustrating an example of the mounting processing routines executed by CPU 91 of control device 90. This processing is executed when control device 90 receives the production program from management device 100 and is instructed to start the production.

When the mounting processing routine is started, CPU 91 of control device 90 first causes board conveyance device 25 to execute board conveyance processing of conveying board 12 and supporting board 12 by support pins 27 (S100). Subsequently, CPU 91 executes nozzle exchange related processing (S110 to S170) of exchanging nozzles 44 attached to mounting head 40 with appropriate type of nozzle 44. In a case where no nozzle 44 is attached to mounting head 40 or in a case where it is determined that one or more nozzles 44 need to be exchanged based on the production program received from management device 100, CPU 91 executes the nozzle exchange related processing. In a case where the exchange of nozzles 44 is unnecessary, CPU 91 skips the nozzle exchange related processing and executes component pickup related processing (S210 to S270).

Hereinafter, the nozzle exchange related processing in a case where all nozzles 44 attached to mounting head 40 are exchanged will be described. In the nozzle exchange related processing, CPU 91 first causes XY robot 30 to move mounting head 40 onto nozzle stocker 24 (S110). Subsequently, CPU 91 executes nozzle exchange processing and post-exchange imaging processing in parallel (S120). The nozzle exchange processing is processing of causing mounting head 40 to exchange nozzles 44 located at the operation positions (nozzle positions N2 and N5). In the nozzle exchange processing, CPU 91 causes XY robot 30 and Z-axis motor 73 to accommodate and remove nozzle 44 located at the operation position in an empty area in nozzle stocker 24, and then attaches appropriate nozzle 44 in nozzle stocker 24 to nozzle holder 42. CPU 91 may simultaneously or sequentially exchange nozzles 44 located at nozzle positions N2 and N5. In a case where nozzle 44 is not attached to nozzle holder 42 at the operation position, CPU 91 omits the operation of removing nozzle 44 and executes the operation of attaching nozzle 44. In the post-exchange imaging processing, CPU 91 causes side camera 80 to image nozzle 44 after the nozzle exchange processing in previous S120, at the immediately following positions (nozzle positions N3 and N6). Therefore, in S120 that is executed for the first time after the nozzle exchange related processing is started, CPU 91 executes only the nozzle exchange processing without executing the post-exchange imaging processing.

Next, CPU 91 executes the post-compression image generation processing of generating a post-compression image in which the data amount is reduced based on the image acquired in the post-exchange imaging processing (S130), and executes nozzle abnormality determination processing of determining the presence or absence of an abnormality of nozzle 44 after the exchange based on the post-compression image (S140). In a state where S120 is executed once after the nozzle exchange related processing is started, since the post-exchange imaging processing is not executed, CPU 91 omits the processing of S130 and S140 and determines that there is no abnormality in nozzle 44.

In a case where there is no abnormality in S140, CPU 91 determines whether the exchange of all nozzles 44 and the nozzle abnormality determination processing are completed (S150), and executes holding body revolving processing of causing R-axis drive device 50 to revolve nozzles 44 when the exchange and the nozzle abnormality determination processing for all nozzles 44 are not completed (S160). In the holding body revolving processing, CPU 91 revolves nozzles 44 by an amount corresponding to one nozzle (pitch corresponding to one nozzle 44). That is, in the present embodiment, nozzles 44 are revolved by 30° (=360°/12, which is the number of nozzles) clockwise when viewed in a top view. As a result, nozzles 44 for which the nozzle exchange processing is executed in S120 are moved from the operation position to the immediately following position. Further, nozzle holder 42 located at the immediately preceding position is moved to the operation position.

After executing the processing of S160, CPU 91 executes the processing of S120 and thereafter. Therefore, CPU 91 executes S120 of the second time. In S120 of the second time, CPU 91 executes the nozzle exchange processing for nozzle 44 located at the operation position, and executes the post-exchange imaging processing for nozzle 44 located at the immediately following position (nozzle 44 for which the nozzle exchange processing is executed in S120 of the first time). For example, in a case where nozzles 44A and 44G are located at the operation positions in S120 of the first time, in S120 of the first time, the nozzle exchange processing is executed for nozzles 44A and 44G, and in S120 of the second time, the nozzle exchange processing is executed for nozzles 44B and 44H located at the operation positions and the post-exchange imaging processing is executed for nozzles 44A and 44G located at the immediately following position. Therefore, in the post-exchange imaging processing in this case, one image is captured, which includes the images illustrated in the upper part of FIG. 8, that is, nozzles 44A and 44G after the exchange as the images of nozzle positions N3 and N6 and nozzles 44C and 44I before the exchange as the images of nozzle positions N1 and N4.

Subsequently, CPU 91 executes the post-compression image generation processing of S130. In the post-compression image generation processing, CPU 91 specifies the target area in the captured image based on the imaging timing of the captured image to be processed this time and correspondence relationship information 93a stored in HDD 93. The post-compression image generation processing of S130 is executed for the image captured in the post-exchange imaging processing of S120, that is, the image captured at the imaging timing after the nozzle exchange. Therefore, CPU 91 refers to correspondence relationship information 93a and specifies the target area corresponding to the imaging timing after the nozzle exchange, that is, the entire images of nozzle positions N3 and N6 in the captured image as the target area. Information (for example, XY coordinates of each image in the captured image) for specifying the area where the image of each of nozzle positions N3, N1, N6, and N4 is disposed in the captured image is stored in HDD 93 in advance. Next, CPU 91 replaces pixels outside the specified target area in the captured image with pixels of the same color. In the present embodiment, pixels outside the target area are replaced with black pixels (for example, pixels having RGB grayscale values of (0, 0, 0) in a case of pixels of a color image, and pixels having a grayscale value of (0) in a case of pixels of a grayscale image). For example, in a case where the captured image to be processed this time is the captured image in the upper part of FIG. 8, CPU 91 sets the entire images of nozzle positions N3 and N6 in the captured image as the target area, replaces pixels outside the target area with black pixels, and changes the captured image to the image illustrated in the lower part of FIG. 8. For example, pixels need only be replaced with the same color instead of black, and for example, may be replaced with white pixels or replaced with gray (intermediate value of grayscale) pixels. Then, CPU 91 generates the post-compression image by compressing the post-replacement image in a predetermined compression format, and stores the post-compression image in HDD 93. In the present embodiment, the compression format is JPEG. In JPEG, in a case where pixels of the same color are continuous, a compression ratio is increased. Therefore, since the post-compression image generated as described above is obtained by compressing the image in which pixels of the portion other than the target area are replaced with pixels of the same color, the compression ratio is improved as compared with a case where the image is compressed without executing the replacement, and the data amount is reduced. The compression format is not limited to JPEG, and need only be a compression format in which the compression ratio is increased by replacing pixels outside the target area with pixels of the same color. For example, the compression format may be PNG or GIF. Here, as described above, since the post-exchange imaging processing is processing of imaging nozzles 44 after the nozzle exchange is executed, at the immediately following position, the images of the immediately preceding positions (nozzle positions N1 and N4) in the captured image is unnecessary. Therefore, by executing the replacement with pixels of the same color without including the images of the immediately preceding positions (nozzle positions N1 and N4) in the target area, the compression ratio is improved and the data amount of the image data (post-compression image) is reduced, while the image of the necessary area (target area) is left.

Next, CPU 91 executes the nozzle abnormality determination processing of S140 based on the post-compression image. In the nozzle abnormality determination processing, CPU 91 acquires, for example, information related to a shape of nozzle 44, such as a position of the tip of nozzle 44 or a thickness of nozzle 44 in each of the images of nozzle positions N3 and N6 based on the post-compression image. Then, CPU 91 determines the presence or absence of the nozzle abnormality depending on whether correct nozzle 44 is present at each of nozzle positions N3 and N6 based on the acquired information.

In a case where it is determined in S140 that there is no abnormality in nozzles 44 located at both nozzle positions N3 and N6, CPU 91 determines in S150 that the exchange of nozzles 44 and the nozzle abnormality determination processing for all nozzles 44 are not completed, and executes the processing of S160 and thereafter. That is, CPU 91 repeatedly executes S160 and S120 to S140. In a case where it is determined in S150 that the exchange of nozzles 44 and the nozzle abnormality determination processing for all nozzles 44 are completed, CPU 91 completes the nozzle exchange related processing and starts the component pickup related processing (S210 to S270). In the present embodiment, only the nozzle exchange processing is executed in S120 of the first time after the nozzle exchange related processing is started, the nozzle exchange processing and the post-exchange imaging processing are executed in S120 of the second to sixth times, only the post-exchange imaging processing is executed in S120 of the seventh time, and thus the exchange of nozzles 44 and the post-exchange imaging processing for all nozzles 44 are completed. By executing the nozzle exchange related processing in this way, each of nozzles 44A to 44L is exchanged with appropriate nozzle 44, and a file of the post-compression images (here, six post-compression images) generated in S130 for nozzles 44A to 44L after the exchange is stored in HDD 93.

In a case where it is determined in S140 that there is the abnormality in nozzle 44 located at any one of nozzle positions N3 and N6, CPU 91 executes nozzle abnormality time processing including processing of exchanging nozzle 44 determined to have the abnormality with correct nozzle 44 (S170). In the nozzle abnormality time processing, for example, CPU 91 revolves nozzles 44 such that nozzle 44 determined to have the abnormality in nozzle 44 is located at the operation position. Then, CPU 91 executes the nozzle exchange processing, the holding body revolving processing, the post-exchange imaging processing, the post-compression image generation processing, and the nozzle abnormality determination processing described above for nozzles 44 again in this order. In a case where it is determined that there is no abnormality in nozzle 44, the processing of S150 and thereafter is executed. In a case where it is determined that there is the abnormality in nozzle 44 even when the nozzle abnormality time processing is executed, CPU 91 may notify management device 100 of information indicating that the nozzle exchange abnormality has occurred, and may complete the present routine. In the nozzle abnormality time processing, only nozzle 44 determined to have the abnormality in S140 is a processing target. Therefore, as illustrated in FIG. 5, in correspondence relationship information 93*a*, "only abnormal nozzle among nozzle positions N3 and N6" as the target area and "entire" as the target range are associated with the imaging timing of "nozzle abnormality time". Therefore, for example, in the post-compression image generation processing during the nozzle abnormality time processing executed in a case where only nozzle 44 located at nozzle position N3 is determined to have the abnormality in S140, unlike S130 described above, CPU 91 sets only the entire images of nozzle position N3 as the target area. Therefore, CPU 91 generates the post-compression image in which, in addition to the images of nozzle positions N1 and N4 among the captured images, pixels of the image of nozzle position N6 are also replaced with black pixels, and stores the post-compression image in HDD 93.

The component pickup related processing (S210 to S270) will be described. The component pickup related processing is processing of causing each of nozzles 44A to 44L to execute pickup and holding of component P, and similarly to the nozzle exchange related processing described above, the operation (here, pickup of component P) at the operation position and the imaging at the immediately following position are executed in parallel. In the component pickup related processing, CPU 91 first causes XY robot 30 to move nozzles 44 to the component supply position of component supply device 20 (S210). As illustrated in FIG. 3, CPU 91 causes XY robot 30 to move mounting head 40 such that nozzles 44 located at the operation positions (nozzle positions N2 and N5) are located immediately above component P located at the component supply position. Subsequently, CPU 91 executes component pickup processing and post-pickup imaging processing in parallel (S220). In the component pickup processing, CPU 91 lowers nozzle 44 located at the operation position, applies a negative pressure to a suction port of a tip surface of nozzle 44, picks up component P located at the component supply position of component supply device 20 by suction at the tip surface, and then lifts nozzle 44. CPU 91 may simultaneously or sequentially execute the pickup of component P by nozzle 44 located at nozzle position N2 and the pickup of component P by nozzle 44 located at nozzle position N5. In the post-pickup imaging processing, CPU 91 causes side camera 80 to image nozzle 44 and component P after the component pickup processing is executed in previous S220 at the immediately following positions (nozzle positions N3 and N6). Next, CPU 91 executes the post-compression image generation processing of generating the post-compression image based on the image acquired in the post-pickup imaging processing (S230), and executes pickup abnormality determination processing of determining the presence or absence of the abnormality of component P after the pickup based on the post-compression image (S240). When there is no abnormality in S240, CPU 91 determines whether the pickup of component P and the pickup abnormality determination processing for all nozzles 44 are completed (S250), and when the pickup and the pickup abnormality determination processing are not completed, CPU 91 executes the holding body revolving processing of revolving nozzles 44 by one pitch of nozzles 44 (S260), and executes the processing after S220 and thereafter. In a case where it is determined in S250 that the pickup of component P and the pickup abnormality determination processing for all nozzles 44 are completed, CPU 91 completes the component pickup related processing. By executing the component pickup related processing in this way, only the component pickup processing is executed in S220 of the first time after the component pickup related processing is started, the component pickup processing and the post-pickup imaging processing are executed in S220 of the second to sixth times, only the post-pickup imaging processing is executed in S220 of the seventh time, and the pickup of component P and the post-pickup imaging processing for all nozzles 44 are completed.

In the post-compression image generation processing of S230 in the component pickup related processing, CPU 91 refers to correspondence relationship information 93*a*, and specifies the target area corresponding to the imaging timing after the component pickup, that is, the periphery of the tip of nozzle 44 of the images of nozzle positions N3 and N6 in the captured image as the target area. The position and the size of the target area (periphery of the tip of nozzle 44) in the image may be determined in advance, but in the present embodiment, CPU 91 specifies the target area based on information of each pixel in the captured image. For example, CPU 91 first detects a contour of nozzle 44 and a contour of component P in the image by detecting a feature point of the pixel (for example, an edge portion of a luminance value of the pixel) in the captured image, and specifies the tip of nozzle 44 (boundary between nozzle 44 and component P). Next, CPU 91 sets the target area in the image as an area having a size and a position including the tip of nozzle 44 and entire component P based on the specified tip of nozzle 44 and information related to the height (thickness) of component P included in the production program. Then, as in S130, CPU 91 generates the post-compression image in which pixels outside the target area are replaced with black pixels, and stores the post-compression image in HDD 93. For example, in a case where the captured image to be processed this time is the captured image in the upper part of FIG. 9, CPU 91 specifies areas A3 and A6 of the periphery of the tip of nozzle 44 in each image based on the images of nozzle positions N3 and N6 in the captured image, and sets areas A3 and A6 as the target areas. Then, CPU 91 replaces pixels outside areas A3 and A6 with black pixels to change the captured image to the image illustrated in the lower part of FIG. 9, and then generates the post-compression image in which the changed image is compressed.

In the pickup abnormality determination processing of S240 in the component pickup related processing, CPU 91 determines the presence or absence of the abnormality of component P in the target area in each of the images of nozzle positions N3 and N6 based on the post-compression image. For example, CPU 91 recognizes the position of component P (for example, a lower end position of component P) based on the post-compression image, determines whether the recognized position is a position within an allowable range based on information (for example, the thickness of component P) related to the shape of component P included in the production program, and determines that there is no pickup abnormality in a case where the recognized position is within the allowable range. As a result, in a case where no component P is held by nozzle 44, or in a case where component P different in type from correct component P is erroneously held, CPU 91 can determine that there is the pickup abnormality.

In this way, in the pickup abnormality determination processing of S240, since the abnormality determination related to component P picked up and held by nozzle 44 in the component pickup processing is executed, an image (image that should include picked up component P) of the periphery of the tip of nozzle 44 located at the immediately following position in the captured image acquired in the post-pickup imaging processing of S220 need only be present. Therefore, in the post-compression image generation processing of S230, the area of the periphery of the tip of nozzle 44 among the immediately following positions (nozzle positions N3 and N6) is set as the target area, and pixels of the other areas are replaced with pixels of the same color, so that the compression ratio is improved and the data amount of the image data (post-compression image) is reduced, while the image of the necessary area (target area) is left.

In a case where it is determined in S240 that there is the pickup abnormality in nozzle 44 located at any one of nozzle positions N3 and N6, CPU 91 executes pickup abnormality time processing including processing of causing nozzle 44 determined to have the abnormality to pick up correct component P (S270). In the pickup abnormality time processing, CPU 91 revolves nozzles 44, for example, such that nozzle 44 determined to have the pickup abnormality is located at the operation position. Then, CPU 91 executes the component pickup processing, the holding body revolving processing, the post-pickup imaging processing, the post-compression image generation processing, and the pickup abnormality determination processing described above for nozzle 44 again in this order. In a case where it is determined that there is no pickup abnormality, the processing of S250 and thereafter is executed. In a case where it is determined that there is the pickup abnormality even after the pickup abnormality time processing is executed, CPU 91 may notify management device 100 of information indicating that the pickup abnormality has occurred, and may complete the present routine. In a case where it is determined in S240 that component P of a type different from correct component P is erroneously held by at least any one of nozzles 44 located at nozzle positions N3 and N6, CPU 91 may execute the pickup abnormality time processing of S270 after disposing of component P held by nozzle 44 by executing disposal related processing described later for nozzle 44. In the pickup abnormality time processing of S270, only nozzle 44 determined to have the abnormality in S240 is the processing target. Therefore, as illustrated in FIG. 5, in correspondence relationship information 93*a*, "only abnormal nozzle among nozzle positions N3 and N6" as the target area and "periphery of tip of nozzle" as the target range are associated with the imaging timing of the "pickup abnormality time". Therefore, for example, in the post-compression image generation processing during the pickup abnormality time processing executed in a case where it is determined in S240 that only nozzle 44 located at nozzle position N3 has the abnormality, unlike S230 described above, CPU 91 sets only the area (area A3 in the example in the upper part of FIG. 9) of the periphery of the tip of nozzle 44 of the image of nozzle position N3 as the target area.

In a case where it is determined in S250 that the pickup of component P and the pickup abnormality determination processing for all nozzles 44 are completed, CPU 91 moves mounting head 40 above part camera 28 and images component P picked up by suction by each nozzle 44, by part camera 28 from below (S300). Then, component abnormality determination processing of recognizing the posture of component P based on the captured image captured by part camera 28 and determining whether there is an abnormality in the posture of each component P is executed (S305). In a case where it is determined in S305 that there is the abnormality in the posture of one or more components P held by multiple nozzles 44, CPU 91 executes the disposal related processing (S310 to S380) of disposing of abnormal component P.

In the disposal related processing, CPU 91 first moves mounting head 40 to a disposal position (not illustrated) (S310). Subsequently, CPU 91 moves nozzle 44 holding component P that is a disposal target to the immediately preceding position (any one of nozzle positions N1 and N4), executes pre-disposal imaging processing of causing side camera 80 to image component P (S320), and executes the post-compression image generation processing of generating the post-compression image based on the captured image and storing the post-compression image in HDD 93 (S330). Next, CPU 91 executes disposal processing of moving nozzle 44 holding component P that is the disposal target to the operation position, releasing the holding of component P by nozzle 44, and disposing of component P (S340). Thereafter, CPU 91 moves nozzle 44 holding component P that is the disposal target to the immediately following position (any one of nozzle positions N3 and N6), executes post-disposal imaging processing of causing side camera 80 to image nozzle 44 after the disposal processing (S350), and executes the post-compression image generation processing of generating the post-compression image based on the captured image and storing the post-compression image in HDD 93 (S360). Then, CPU 91 executes disposal abnormality determination processing of determining the presence or absence of a disposal abnormality (whether the disposal is normally executed) based on the post-compression image before the disposal and the post-compression image after the disposal generated in S330 and S360 (S370), and in a case where there is no disposal abnormality, completes the disposal related processing. In a case where there are multiple components P that are the disposal targets, the disposal related processing may be repeated multiple times.

In the disposal related processing, only nozzle 44 holding component P that is the disposal target is the processing target. Therefore, as illustrated in FIG. 5, in correspondence relationship information 93*a*, "only disposal target nozzle among immediately preceding positions (nozzle positions N1 and N4)" as the target area and "periphery of tip of nozzle" as the target range are associated with the imaging timing of "before component disposal". In addition, "only disposal target nozzle among immediately following positions (nozzle positions N3 and N6)" as the target area and "periphery of tip of nozzle" as the target range are associated with the imaging timing of "after component disposal". Therefore, in the post-compression image generation processing of S330 and S360, CPU 91 specifies the periphery of the tip of nozzle 44 of the disposal target nozzle as the target area based on correspondence relationship information 93*a*, and generates the post-compression image by replacing pixels outside the target area with black. For example, in a case where nozzle 44A is the disposal target nozzle, CPU 91 specifies the periphery of the tip of nozzle 44 (nozzle 44A) of the image of the immediately preceding position (nozzle position N1 or nozzle position N4) at which nozzle 44A is present in the captured image as the target area in S330, and specifies the periphery of the tip of nozzle 44 (nozzle 44A) of the image of the immediately following position (nozzle position N3 or nozzle position N6) at which nozzle 44A is present in the captured image as the target area in S360. CPU 91 may specify the target area of the periphery of the tip of nozzle 44 in the image in S330 based on the tip of nozzle 44 specified based on the image and the information related to the height of component P (correct component P originally held by nozzle 44 that is the disposal target) included in the production program as in S230. Alternatively, CPU 91 may detect the contour of nozzle 44 and the contour of component P in the image by detecting the feature point of the pixel (for example, the edge portion of the luminance value of the pixel) in the captured image, and may specify the target area as an area including entire component P (and the tip of nozzle 44) in image. In addition, it is preferable that CPU 91 sets the target area of the periphery of the tip of nozzle 44 in the image set in S360 to include the same area as the target area in S330. For example, CPU 91 may specify the position of the tip of nozzle 44 in the image in S360, and may specify an area having the same position and size as the target area specified in S330 as the target area in S360 with reference to the position of the tip. As a result, it is possible to set the target area having the same position and size with reference to the position of the tip of nozzle 44 between the image before the disposal and the image after the disposal. Therefore, it is easy to determine the abnormality using the post-compression images before and after the disposal in the disposal abnormality determination processing.

In the disposal abnormality determination processing of S370, CPU 91 determines whether the disposal of component P is normally executed based on the post-compression image including a state before the disposal generated in S330 and the post-compression image including a state after the disposal generated in S360. For example, based on a difference between the values of pixels of the post-compression image before and after the disposal, in a case where component P present in the target area before the disposal is no longer present after the disposal, CPU 91 determines that the disposal is normally executed and there is no disposal abnormality. On the other hand, in a case where component P is present even after the disposal, CPU 91 determines that there is the disposal abnormality, executes error occurrence time processing of notifying management device 100 of information indicating that the disposal abnormality has occurred (S380), and completes the present routine.

In a case where it is determined in S370 that there is no disposal abnormality, CPU 91 executes post-disposal pickup processing of picking up correct component P by nozzle 44 that is the disposal target (S400). In the present embodiment, in the post-disposal pickup processing, the same processing as the pickup abnormality time processing of S270 described above is executed for nozzle 44 that is the disposal target. As a result, correct component P is picked up and held by nozzle 44 that is the disposal target. The post-compression image generated in the post-disposal pickup processing is also stored in HDD 93.

In a case where it is determined in S305 that there is no abnormality in any posture of component P held by multiple nozzles 44, or after the post-disposal pickup processing of S400, CPU 91 executes mounting related processing of mounting component P held by each of nozzles 44A to 44L on board 12 (S420 to S470).

In the mounting related processing, CPU 91 first executes pre-mounting imaging processing, component mounting processing, and post-mounting imaging processing in parallel (S420). In the pre-mounting imaging processing, CPU 91 causes side camera 80 to image nozzle 44 in a state of holding component P before component P is mounted at the immediately preceding positions (nozzle positions N1 and N4). The component mounting processing is executed on nozzles 44 for which the pre-mounting imaging processing is executed in previous S420 and which are located at the operation positions (nozzle positions N2 and N5). In the component mounting processing, CPU 91 moves mounting head 40 such that nozzle 44 located at the operation position is located immediately above the mounting position of component P on board 12, lowers nozzle 44, releases the holding of component P, mounts component P on board 12, and lifts nozzle 44. CPU 91 may simultaneously or sequentially execute the mounting of component P held by nozzle 44 located at nozzle position N2 and the mounting of component P held by nozzle 44 located at nozzle position N5. In the post-mounting imaging processing, CPU 91 causes side camera 80 to image nozzle 44 after the component mounting processing is executed in previous S420 at the immediately following positions (nozzle positions N3 and N6). As described above, since side camera 80 simultaneously images nozzle positions N1, N3, N4, and N6, side camera 80 can acquire one captured image by simultaneously executing the pre-mounting imaging processing and the post-mounting imaging processing of S420 in one imaging. Next, CPU 91 executes the post-compression image generation processing of generating the post-compression image based on the image acquired in the pre-mounting imaging processing and the post-mounting imaging processing and storing the post-compression image in HDD 93 (S430), and executes mounting abnormality determination processing of determining the presence or absence of the abnormality at the mounting time based on the post-compression image (S440). In a case where there is no abnormality in S440, CPU 91 determines whether the component mounting processing and the mounting abnormality determination processing for all nozzles 44 are completed (S450), and when the component mounting processing and the mounting abnormality determination processing are not completed, CPU 91 executes the holding body revolving processing of revolving nozzles 44 by one pitch of nozzles 44 (S460), and executes the processing of S420 and thereafter. In a case where it is determined in S450 that the component mounting processing and the mounting abnormality determination processing for all nozzles 44 are completed, CPU 91 completes the mounting related processing. By executing the mounting related processing in this way, only the pre-mounting imaging processing is executed in S420 of the first time after the mounting related processing is started, the pre-mounting imaging processing and the component mounting processing are executed in S420 of the second time, the pre-mounting imaging processing, the component mounting processing, and the post-mounting imaging processing are executed in S420 of the third to sixth times, the component mounting processing and the post-mounting imaging processing are executed in S420 of the seventh time, and only the post-mounting imaging processing is executed in S420 of the eighth time. As a result, the pre-mounting imaging processing, the component mounting processing, the post-mounting imaging processing, and the mounting abnormality determination processing are executed in this order for each of multiple nozzles 44.

In the post-compression image generation processing of S430 in the mounting related processing, CPU 91 refers to correspondence relationship information 93a, specifies the target area corresponding to at least one of the imaging timings before the component mounting and after the component mounting, and generates the post-compression image by replacing pixels outside the target area in the captured image in S420 with black. For example, since the pre-mounting imaging processing is executed and the post-mounting imaging processing is not executed in S420 of the first and second times after the mounting related processing is started, in S430 of the first and second times, the target areas corresponding to the imaging timing before the component mounting, that is, the peripheries of the tips of nozzles 44 of the images of nozzle positions N1 and N4 in the captured image are specified as the target areas. Since the pre-mounting imaging processing and the post-mounting imaging processing are executed together in S420 of the third to sixth times after the mounting related processing is started, in S430 of the third to sixth times, the target areas associated with the imaging timings before the component mounting and after the component mounting in correspondence relationship information 93a, that is, the peripheries of the tips of nozzles 44 of the images of nozzle positions N1, N4, N3, and N6 in the captured image are specified as the target areas. Since the pre-mounting imaging processing is not executed and the post-mounting imaging processing is executed in S420 of the seventh and eighth times after the mounting related processing is started, in S430 of the seventh and eighth times, the target areas corresponding to the imaging timing after the component mounting, that is, the peripheries of the tips of nozzles 44 of the images of nozzle positions N3 and N6 in the captured image are specified as the target areas.

It is preferable that the target areas (here, the peripheries of the tips of nozzles 44 of the images of nozzle positions N1 and N4) corresponding to the imaging timing before the component mounting are specified as an area including the tip of nozzle 44 and component P held by nozzle 44. The target area can be specified in the same manner as the post-compression image generation processing of S230 or S330 described above. The target areas (here, the peripheries of the tips of nozzles 44 of the images of nozzle positions N3 and N6) corresponding to the imaging timing after the component mounting can be specified, for example, in the same manner as the post-compression image generation processing of S360. It is preferable that CPU 91 sets the target area corresponding to the imaging timing after the component mounting such that the same area as the target area set in the image at the imaging timing before the component mounting for same nozzle 44 as nozzle 44 included in the target area is included. For example, in a case where nozzle 44A is located at nozzle position N1 and the image including nozzle 44A is captured in S420 of the first time, in S430 of the first time, the area in the periphery of the tip of nozzle 44A located at nozzle position N1 is specified as the target area corresponding to the imaging timing before the component mounting. In S420 of the third time, nozzle 44A is located at nozzle position N3, and the image including nozzle 44A is captured. In this case, in S430 of the third time, CPU 91 specifies the position of the tip of nozzle 44 (nozzle 44A) in the image of nozzle position N3 based on the image captured in S420 of the third time, and specifies the area having the same position and size as the target area specified in the image of nozzle position N1 of S430 of the first time as the target area in the image of nozzle position N3 of S430 of the third time with reference to the position of the tip. In this way, in relation to same nozzle 44 (for example, nozzle 44A), the target areas having the same position and size can be set with reference to the position of the tip of nozzle 44A between the image before the component mounting and the image after the component mounting. Therefore, it is easy to compare the post-compression images before and after the mounting in the mounting abnormality determination processing, and it is easy to determine the abnormality.

In the mounting abnormality determination processing of S440, CPU 91 determines whether the mounting of component P held by nozzle 44 is normally executed based on the post-compression image including a state of nozzle 44 after the component mounting generated in S430 and the post-compression image including a state of nozzle 44 before the component mounting generated in S430 for same nozzle 44. For example, a case where nozzles 44A and 44G are located at nozzle positions N1 and N4 in S420 of the first time and nozzles 44A and 44G are located at nozzle positions N3 and N6 in S420 of the third time will be considered. In this case, in S440 of the third time, CPU 91 determines whether component P held by nozzle 44A is normally mounted based on the image of nozzle position N3 in the post-compression image generated in S430 of the third time (that is, the image of nozzle 44A after the component mounting) and the image of nozzle position N1 in the post-compression image generated in S430 of the first time (that is, the image of nozzle 44A before the component mounting). For example, based on the difference between the values of pixels of the post-compression image before and after the mounting, in a case where component P held by nozzle 44A present in the target area before the mounting is no longer present after the mounting, CPU 91 determines that the mounting is normally executed and there is no mounting abnormality. On the other hand, in a case where component P is present even after the mounting, CPU 91 determines that component P is taken back during the mounting and there is the mounting abnormality. Similarly, in S440 of the third time, CPU 91 determines whether component P held by nozzle 44G is normally mounted based on the image of nozzle position N6 in the post-compression image generated in S430 of the third time (that is, the image of nozzle 44G after the component mounting) and the image of nozzle position N4 in the post-compression image generated in S430 of the first time (that is, the image of nozzle 44G before the component mounting).

As described above, in the present embodiment, in S430 executed two times before S430 in which the post-compression image including the state of nozzle 44 after the component mounting is generated, the post-compression image of same nozzle 44 before the component mounting is generated. Therefore, in S440 of the first and second times, since there is no nozzle 44 in which both the post-compression image before the component mounting and the post-compression image after the component mounting are generated, CPU 91 omits the determination based on the post-compression image in S440 of the first and second time and determines that there is no mounting abnormality. In S440 of the third and subsequent times, CPU 91 determines the presence or absence of the mounting abnormality by using the post-compression images of nozzles 44 before the component mounting and after the component mounting as described above.

In a case where it is determined in S440 that there is the mounting abnormality (here, taking back of component P) in at least any one of nozzles 44 (nozzles 44 located at nozzle positions N3 and N6) determined to have the abnormality, CPU 91 disposes of component P in which component P is taken back (S470) by executing the same processing as the disposal related processing (S310 to S380) described above, and executes the processing of S450 and thereafter.

In a case where it is determined in S450 that the component mounting processing and the mounting abnormality determination processing for all nozzles 44 are completed, CPU 91 executes set file generation processing of generating the set file by grouping the multiple post-compression images generated by the post-compression image generation processing (S130, S230, S330, S360, and S430) executed so far in the mounting processing routine into one file, and set file transmission processing of transmitting the generated set file to management device 100 (S500). In the present embodiment, the post-compression image generation processing of S130 and S230 is executed six times, the post-compression image generation processing of S430 is executed eight times, and a total of 20 post-compression images are stored in HDD 93. In addition, when the nozzle abnormality time processing of S170, the pickup abnormality time processing of S270, the disposal related processing of S310 to S380, the disposal related processing of S470, and the like are executed, a larger number of post-compression images are stored in HDD 93. In the set file generation processing, CPU 91 generates the set file as an image file in which the multiple post-compression images are combined and the multiple post-compression images are arranged (for example, arranged from the upper left to the lower right in the imaging order) to obtain one image. The set file is an image file compressed in a predetermined compression format similarly to the post-compression image, and is a JPEG file in the present embodiment. As a result, one set file is stored in HDD 93 instead of the multiple post-compression images. In the set file transmission processing, CPU 91 transmits the created set file to management device 100. As a result, the set file is stored in HDD 103 of management device 100. CPU 91 may delete the set file from HDD 93 after the set file transmission processing. In the set file generation processing, CPU 91 may add, to the set file, identification information for identifying each of the multiple post-compression images in the set file. For example, the identification information may be pasted as an image in each area (image) of the multiple post-compression images in the set file. The identification information includes, for example, imaging date and time, the imaging timing, an imaging number indicating the number of the captured image, and position information indicating the nozzle position of the target area, and one or more of the imaging date and time, the imaging timing, the imaging number, and the position information may be included in the identification information.

When the set file is generated and transmitted in S500, CPU 91 determines whether the mounting processing of current board 12 is completed (S510), and when the mounting processing of current board 12 is not completed, CPU 91 executes the processing of S110 and thereafter. That is, after executing the nozzle exchange related processing as necessary, CPU 91 executes the component pickup related processing, the mounting related processing, or the like to mount component P on board 12. On the other hand, when the mounting processing of current board 12 is completed in S510, CPU 91 discharges board 12 for which the mounting is completed to board conveyance device 25 (S520), and completes the present routine. When there is board 12 for which the mounting processing is executed next, CPU 91 executes the mounting processing routine again from S100.

Here, a correspondence relationship between elements of the present embodiment and elements of the present disclosure will be clarified. Mounting device 10 of the present embodiment corresponds to a mounting device and an image processing device of the present disclosure, mounting head 40 corresponds to a mounting head, side camera 80 corresponds to an imaging section, and control device 90 that executes the processing of S130, S230, S330, S360, and S430 of the mounting processing routines illustrated in FIGS. 6 and 7 corresponds to an image processing section. Control device 90 that executes the processing of S500 of the mounting processing routine illustrated in FIG. 7 corresponds to a set file generation section.

In mounting device 10 described in detail above, side camera 80 captures the captured image (for example, the images in the upper part of FIG. 8 and the upper part of FIG. 9) including two or more (here, four nozzles 44 located at nozzle positions N1, N3, N4, and N6) of multiple nozzles 44 (44A to 44L). Then, control device 90 executes the post-compression image generation processing of generating the post-compression image by setting the area including the periphery of the tip of at least one nozzle 44 in the captured image as the target area, replacing pixels outside the target area in the captured image with pixels of the same color, and compressing the post-replacement image (for example, the images in the lower part of FIG. 8 and the lower part of FIG. 9) in the predetermined compression format. Since the post-compression image generated in this way is obtained by compressing the image in which the portion other than the target area in the captured image is replaced with pixels of the same color, the compression ratio is improved as compared with a case where the image is compressed without executing the replacement. As a result, in mounting device 10, the data amount of the image data (post-compression image) can be reduced. As a result, for example, an area used for storing the image data in HDD 93 can be reduced.

In addition, in the post-compression image generation processing, control device 90 specifies the target area in the captured image based on the imaging timing of the captured image and a predetermined correspondence relationship (here, correspondence relationship information 93*a*) between the imaging timing and the target area. As a result, control device 90 can appropriately specify the target area based on the imaging timing.

Further, control device 90 executes set file generation processing of generating a set file by grouping multiple post-compression images generated by executing the post-compression image generation processing on each of the multiple captured images into one file. As a result, since the multiple post-compression images are grouped into one set file, the number of files can be reduced as compared with a case where the multiple post-compression images are used as separate files. Further, in the present embodiment, since the set file is generated in a form of one image file by arranging the multiple post-compression images, header information of the file can be reduced. For example, in a case where the multiple post-compression images are set as separate files, the header information is present for each of the files. In contrast, in the present embodiment, only the header information of one set file is present, and the data amount of the header information can be reduced. As a result, the data amount of the image data can also be reduced.

Furthermore, control device 90 executes the set file transmission processing of transmitting the generated set file to management device 100. Here, as described above, mounting system 1 includes multiple mounting devices 10, and a large number of set files transmitted from each of multiple mounting devices 10 are stored in HDD 103 of management device 100. Even in such a case, since the compression ratio is improved and the data amount is reduced by replacing pixels outside the target area in the captured image in the image in the set file with the same color as described above, the area used for storing the image data (set file) in HDD 103 can be reduced. In addition, since the image data is less likely to suppress the storage capacity of HDD 103 due to the reduction in the data amount, a large number of image data can be easily saved (stored) for a long period. Therefore, for example, the past image data is easily used for analysis of the abnormality occurring in mounting device 10, and the cause of the abnormality is easily investigated or solved. Furthermore, since mounting device 10 does not transmit the multiple post-compression images as separate image data to management device 100 but groups the multiple post-compression images as one set file and transmits the multiple post-compression images to management device 100, the number of files of the image data stored in HDD 103 can be reduced. As a result, fragmentation of HDD 103 can be suppressed. Although the same effect can be also obtained in HDD 93 of mounting device 10, since the image data is transmitted from multiple mounting devices 10 to HDD 103, it is significant to reduce the data amount or the number of files in relation to the image data stored in HDD 103.

The present disclosure is not limited in any way to the embodiments described above, and it is needless to say that the present disclosure can be implemented in various forms without departing from the technical scope of the present disclosure.

Figure 10:
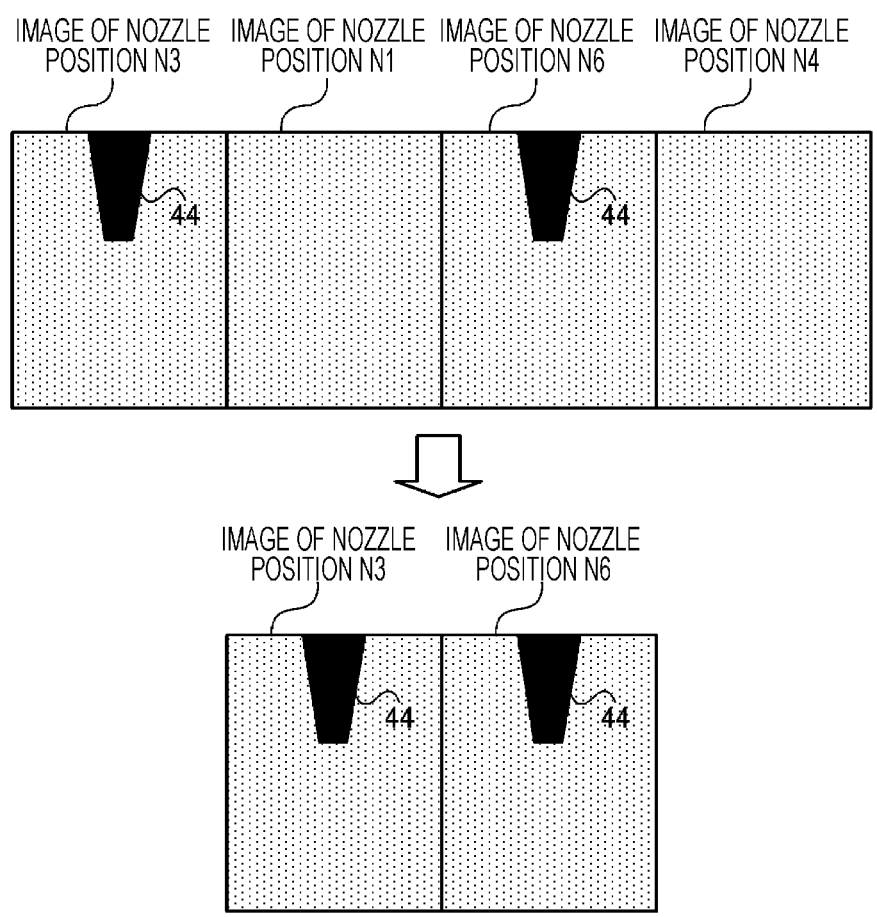
FIG. 10 is a view illustrating an example of post-compression image generation processing of a modification example.

For example, in the embodiments described above, in the post-compression image generation processing, CPU 91 generates a post-compression image by replacing pixels outside the target area in the captured image with pixels of the same color and compressing the post-replacement image in the predetermined compression format, but the post-compression image may be generated by another method. FIG. 10 is a view illustrating an example of post-compression image generation processing of a modification example. FIG. 10 illustrates an example in which the entire images of nozzle positions N3 and N6 is the target area as in FIG. 8. In a case where the captured image to be processed this time is the captured image in the upper part of FIG. 10, CPU 91 cuts out and arranges the target area in the captured image, that is, the entire images of nozzle positions N3 and N6 to generate a new image illustrated in the lower part of FIG. 10, and generates the post-compression image obtained by compressing the new image. In a case where the post-compression image generation processing is executed as described above, the number of pixels of the new image is smaller than the number of pixels of the image before the cutout, and thus the data amount of the image data (post-compression image) can be reduced as compared with a case where the captured image is compressed as it is without executing the cutout. In a case where the new image is generated as in the lower part of FIG. 10, CPU 91 may delete the data of the captured image in the upper part of FIG. 10.

In the embodiments described above, CPU 91 combines the multiple post-compression images to generate one image file as the set file in the set file generation processing of S500, but the configuration is not limited to this. For example, CPU 91 may generate the set file by grouping the multiple post-compression images as one file while maintaining a state where the multiple post-compression images are not grouped into one image. For example, CPU 91 may generate a set file in an MNG format in which the multiple post-compression images are grouped into one file. In this case, the data amount of the header information cannot be reduced unlike the set file of the embodiments described above, but the number of files can be reduced.

In the embodiments described above, in S500, CPU 91 generates the set file by grouping the multiple post-compression images generated in the post-compression image generation processing (S130, S230, S330, S360, and S430) executed so far in the mounting processing routine into one file, but a timing of generating the set file or a unit of the group of the post-compression images included in one set file can be appropriately changed. For example, for each of the nozzle exchange related processing, the component pickup related processing, the disposal related processing, and the mounting related processing, CPU 91 may group the post-compression images generated during each processing at the completion of each processing into one set file. CPU 91 may group the multiple post-compression images having the same imaging timing after the nozzle exchange or before the component disposal into one set file. CPU 91 may group the multiple post-compression images generated during the processing for one board 12 into one set file. For example, in a case where it is determined in S510 that the mounting processing of current board 12 is completed, CPU 91 may group the multiple post-compression images generated so far in the mounting processing routine into one set file. Further, the timing at which CPU 91 transmits the set file to management device 100 is not limited to the embodiments described above. For example, after multiple set files are generated, CPU 91 may group the multiple set files and transmit the grouped multiple set files to management device 100. CPU 91 may continue to store the set file in HDD 93 without transmitting the set file to management device 100.

In the embodiments described above, CPU 91 generates the set file and transmits the set file to management device 100 in S500, but may transmit the multiple post-compression images to management device 100 without generating the set file, or may continue to store the multiple post-compression images in HDD 93 without transmitting the multiple post-compression images. Also in this case, since the data amount of the post-compression image is reduced as described above, the effect of reducing the area used for storing the image data in HDD 93 or HDD 103 is obtained.

In the embodiments described above, CPU 91 specifies the target area based on correspondence relationship information 93a, but correspondence relationship information 93a is not limited to the example illustrated in FIG. 5. The target area need only be set to include a necessary area in the captured image (for example, an area used for the abnormality determination in the nozzle abnormality determination processing of S140 in a case of the image captured in the post-exchange imaging processing of S120). For example, the target range associated with the imaging timing after the component pickup is not limited to the periphery of the nozzle tip and may be the entire target nozzle position. The target nozzle position associated with the imaging timing at the nozzle abnormality time may be not only the abnormal nozzle but also both nozzle positions N3 and N6.

In the embodiments described above, there are two operation positions as the positions of nozzles 44, and there are four imaging positions (immediately preceding position and immediately following position) of side camera 80, but the configuration is not limited to this, and one or more operation positions need only be present. Two or more imaging positions need only be present.

In the embodiments described above, 12 nozzles 44 are disposed circumferentially at equal intervals, but the number of nozzles 44 is not limited to 12, and the number of nozzles 44 may be, for example, 8, 20, 24, or the like. The number of nozzles 44 may be an even number or an odd number.

Figure 8:
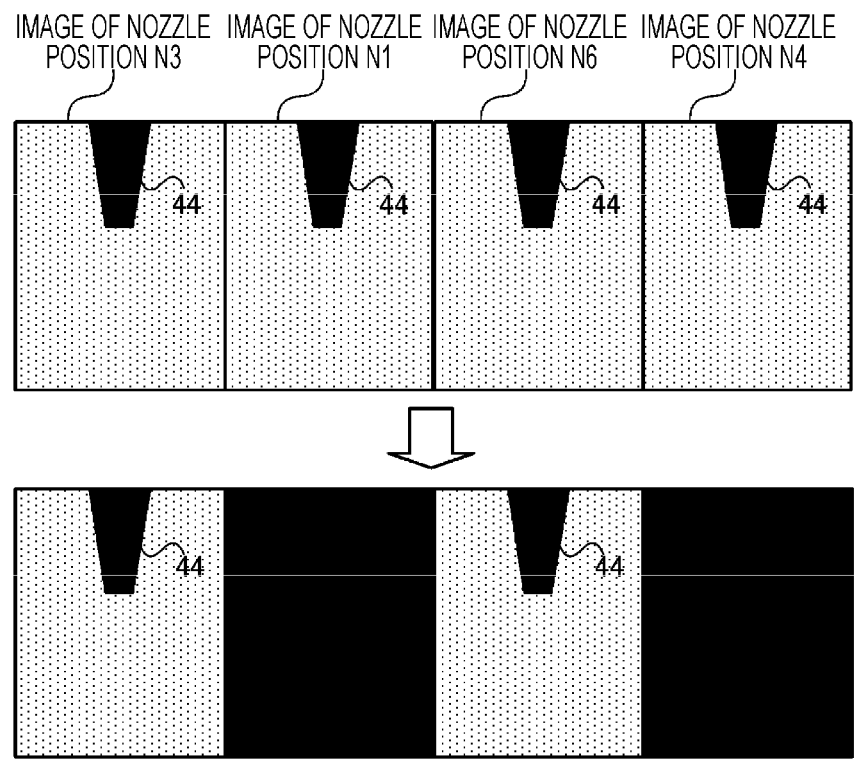
FIG. 8 is a view illustrating an example of an image captured after nozzle exchange and post-compression image generation processing for the image.
Figure 9:
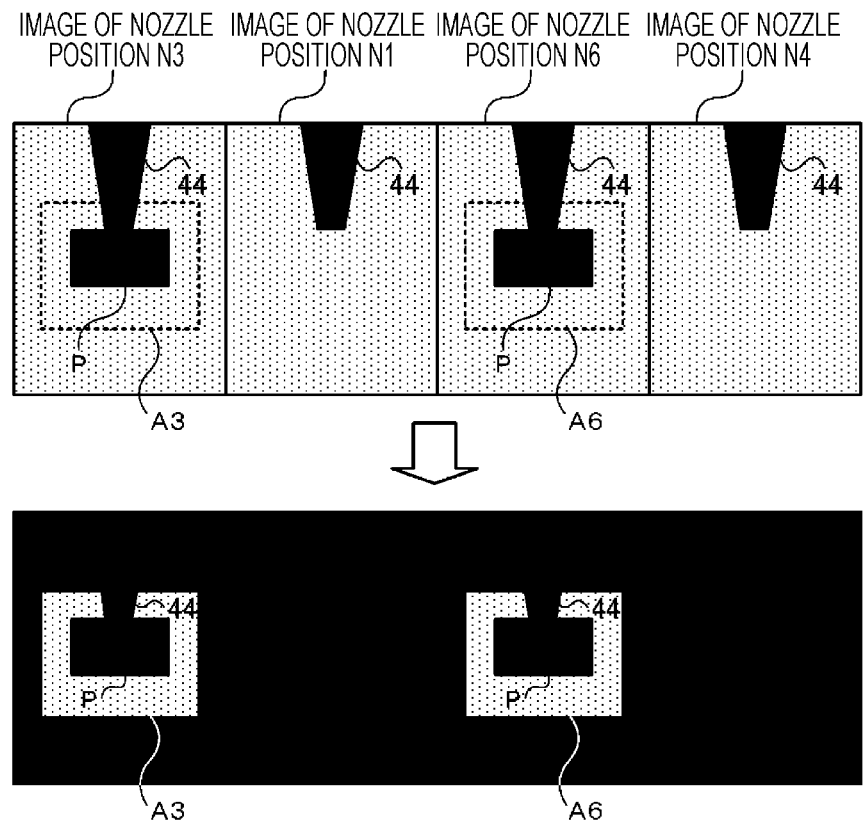
FIG. 9 is a view illustrating an example of an image captured after component pickup and post-compression image generation processing for the image.

In the embodiments described above, side camera 80 captures one captured image in which the objects located at nozzle positions N3, N1, N6, and N4 are disposed in this order from left to right as illustrated in the upper part of FIG. 8, but the configuration is not limited to this. For example, side camera 80 may capture one captured image in which the objects located at nozzle positions N3, N1, N6, and N4 are disposed at the upper left, the upper right, the lower left, and the lower right, respectively. By changing the optical path of the optical system unit provided in side camera 80, the position of the object in the captured image can be appropriately changed.

In the embodiments described above, mounting head 40 includes nozzles 44 that pick up components P by suction using the negative pressure, but mounting head 40 need only include, in addition to nozzles 44, holding bodies that hold the components. For example, mounting head 40 may include mechanical chucks that grip and hold components P instead of nozzles 44.

In the embodiments described above, mounting device 10 serves as both the mounting device and the image processing device of the present disclosure, but the configuration is not limited to this. For example, an image processing device different from mounting device 10 may acquire the captured image from mounting device 10 and may execute the post-compression image generation processing or the set file generation processing described above. For example, management device 100 may execute the post-compression image generation processing or the set file generation processing. The post-compression image generation processing or the set file generation processing may be executed by multiple devices in cooperation with each other. For example, in a case where mounting device 10 and management device 100 cooperate with each other to execute the processing, mounting device 10 and management device 100 correspond to the image processing device of the present disclosure.

In the embodiments, HDD 93 or HDD 103 stores the post-compression image or the set file, but a nonvolatile storage section that stores an image need only store the post-compression image or the set file, instead of HDD.

The present disclosure may be configured as follows.

A second mounting device of the present disclosure is a mounting device for mounting components on a board, the mounting device including a mounting head including multiple holding bodies configured to hold the components at tips, an imaging section configured to capture a captured image including two or more of the multiple holding bodies, and an image processing section configured to execute post-compression image generation processing of generating a post-compression image by setting an area including a periphery of the tip of at least one holding body in the captured image as a target area, cutting out pixels of the target area in the captured image to obtain a new image, and compressing the new image in a predetermined compression format.

In the second mounting device, the imaging section captures the captured image including two or more of the multiple holding bodies. Then, the image processing section executes the post-compression image generation processing of generating the post-compression image by setting the area including the periphery of the tip of at least one holding body in the captured image as the target area, cutting out pixels of the target area in the captured image to obtain the new image, and compressing the new image in the predetermined compression format. In this case, since the number of pixels of the new image is smaller than the number of pixels of the image before the cutout, the data amount of the image data (post-compression image) can be reduced as compared with a case where the captured image is compressed as it is without executing the cutout.

In the first mounting device or the second mounting device of the present disclosure, the image processing section may be configured to, in the post-compression image generation processing, specify the target area in the captured image based on an imaging timing of the captured image and a predetermined correspondence relationship between the imaging timing and the target area. In this way, the image processing section can appropriately specify the target area based on the imaging timing. Here, the imaging timing may include, for example, one or more timings of after the mounting head holds the holding bodies, after the holding bodies hold the components, before the components held by the holding bodies are mounted, after the components held by the holding bodies are mounted, before the components held by the holding bodies are disposed of, and after the components held by the holding bodies are disposed of. The imaging timing may include an imaging order. The correspondence relationship between the imaging timing and the target area may include a correspondence relationship between the imaging timing and information for specifying the holding body included in the target area among the multiple holding bodies in the captured image.

The first mounting device or the second mounting device of the present disclosure may further include a set file generation section configured to generate a set file by grouping multiple post-compression images generated by the image processing section executing the post-compression image generation processing for each of multiple captured images into one file. In this way, since multiple post-compression images are grouped into one set file, the number of files can be reduced as compared with a case where the multiple post-compression images are set as separate files as they are. Here, the set file may be one image file generated by combining the multiple post-compression images, or may be the multiple post-compression images which are grouped into one file without being one image.

A first image processing device of the present disclosure is an image processing device for executing image processing of a captured image including two or more of multiple holding bodies in a mounting device for mounting components on a board, the mounting device including a mounting head including the multiple holding bodies configured to hold the components at tips, the image processing device including an image processing section configured to execute post-compression image generation processing of generating a post-compression image by setting an area including a periphery of the tip of at least one holding body in the captured image as a target area, replacing pixels outside the target area in the captured image with pixels of the same color, and compressing a post-replacement image in a predetermined compression format.

In the first image processing device, the image processing section executes the same processing as the image processing section of the first mounting device of the present disclosure described above. As a result, the image processing device can reduce the data amount of the image data (post-compression image). In the first image processing device, various aspects of the mounting device of the present disclosure described above may be adopted, or a configuration for achieving each function of the mounting device of the present disclosure described above may be added.

A second image processing device of the present disclosure is an image processing device for executing image processing of a captured image including two or more of multiple holding bodies in a mounting device for mounting components on a board, the mounting device including a mounting head including the multiple holding bodies configured to hold the components at tips, the image processing device including an image processing section configured to execute post-compression image generation processing of generating a post-compression image by setting an area including a periphery of the tip of at least one holding body in the captured image as a target area, cutting out pixels of the target area in the captured image to obtain a new image, and compressing the new image in a predetermined compression format.

In the second image processing device, the image processing section executes the same processing as the image processing section of the second mounting device of the present disclosure described above. As a result, the image processing device can reduce the data amount of the image data (post-compression image). In the second image processing device, various aspects of the mounting device of the present disclosure described above may be adopted, or a configuration for achieving each function of the mounting device of the present disclosure described above may be added.

INDUSTRIAL APPLICABILITY

The present disclosure can be applied to various industries where the operation of mounting the components on the board is executed.

REFERENCE SIGNS LIST

1: mounting system, 10: mounting device, 12: board, 20: component supply device, 21: reel, 22: tape, 24: nozzle stocker, 25: board conveyance device, 26: conveyor belt, 27: support pin, 28: part camera, 29: mark camera, 30: XY robot, 31: X-axis guide rail, 32: X-axis slider, 33: Y-axis guide rail, 34: Y-axis slider, 36: X-axis motor, 38: Y-axis motor, 40: mounting head, 41: head main body, 41a: reflective body, 42: nozzle holder, 42a: engagement piece, 44, 44A to 44L: nozzle, 45: tip surface, 46: pressure adjustment valve, 50: R-axis drive device, 51: R shaft, 52: R-axis gear, 53: gear, 54: R-axis motor, 55: R-axis position sensor, 60: Q-axis drive device, 61: Q-axis gear, 62: Q-axis gear, 63, 64: gear, 65: Q-axis motor, 66: Q-axis position sensor, 70: Z-axis drive device, 71: Z-axis slider, 71a: gripping section, 72: ball screw, 73: Z-axis motor, 74: Z-axis position sensor, 80: side camera, 82: camera main body, 84: housing, 86a to 86d: first to fourth incidence ports, 87: luminous body, 88a to 88k: mirror, 90: control device, 91: CPU, 92: ROM, 93: HDD, 93a: correspondence relationship information, 94: RAM, 95: input/output interface, 96: bus, 100: management device, 101: CPU, 102: ROM, 103: HDD, 104: RAM, 105: input/output interface, 106: bus, 107: input device, 108: display, N1 to N6: nozzle position, P: component, A3, A6: area

The invention claimed is:

1. A mounting device for mounting components on a board, the mounting device comprising:
    a mounting head including multiple holding bodies configured to hold the components at tips;
    an imaging section configured to capture a captured image including two or more of the multiple holding bodies;
    an image processing section configured to execute post-compression image generation processing of generating a post-compression image by setting an area including a periphery of the tip of at least one holding body in the captured image as a target area, replacing pixels outside the target area in the captured image with pixels of a same color, and compressing a post-replacement image in a predetermined compression format; and
    a set file generation section configured to generate a set file by grouping multiple post-compression images generated by the image processing section executing the post-compression image generation processing for each of multiple captured images into one file.

2. A mounting device for mounting components on a board, the mounting device comprising:
    a mounting head including multiple holding bodies configured to hold the components at tips;
    an imaging section configured to capture a captured image including two or more of the multiple holding bodies;
    an image processing section configured to execute post-compression image generation processing of generating a post-compression image by setting an area including a periphery of the tip of at least one holding body in the captured image as a target area, cutting out pixels of the target area in the captured image to obtain a new image, and compressing the new image in a predetermined compression format; and a set file generation section configured to generate a set file by grouping multiple post-compression images generated by the image processing section executing the post-compression image generation processing for each of multiple captured images into one file.

3. The mounting device according to claim 1, wherein the image processing section is configured to, in the post-compression image generation processing, specify the target area in the captured image based on an imaging timing of the captured image and a predetermined correspondence relationship between the imaging timing and the target area.

4. An image processing device for executing image processing of a captured image including two or more of multiple holding bodies in a mounting device for mounting components on a board, the mounting device including a mounting head including the multiple holding bodies configured to hold the components at tips, the image processing device comprising:

an image processing section configured to execute post-compression image generation processing of generating a post-compression image by setting an area including a periphery of the tip of at least one holding body in the captured image as a target area, replacing pixels outside the target area in the captured image with pixels of a same color, and compressing a post-replacement image in a predetermined compression format; and a set file generation section configured to generate a set file by grouping multiple post-compression images generated by the image processing section executing the post-compression image generation processing for each of multiple captured images into one file.

5. An image processing device for executing image processing of a captured image including two or more of multiple holding bodies in a mounting device for mounting components on a board, the mounting device including a mounting head including the multiple holding bodies configured to hold the components at tips, the image processing device comprising:

an image processing section configured to execute post-compression image generation processing of generating a post-compression image by setting an area including a periphery of the tip of at least one holding body in the captured image as a target area, cutting out pixels of the target area in the captured image to obtain a new image, and compressing the new image in a predetermined compression format; and a set file generation section configured to generate a set file by grouping multiple post-compression images generated by the image processing section executing the post-compression image generation processing for each of multiple captured images into one file.

* * * * *